United States Patent
State

(10) Patent No.: US 10,795,916 B2
(45) Date of Patent: Oct. 6, 2020

(54) TEMPORAL CLUSTERING OF SOCIAL NETWORKING CONTENT

(71) Applicant: Facebook, Inc., Menlo Park, CA (US)

(72) Inventor: Bogdan State, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 650 days.

(21) Appl. No.: 15/070,946

(22) Filed: Mar. 15, 2016

(65) Prior Publication Data

US 2017/0270180 A1 Sep. 21, 2017

(51) Int. Cl.
G06F 16/28 (2019.01)
G06F 16/9537 (2019.01)
G06F 40/169 (2020.01)
G06F 16/9536 (2019.01)
G06Q 50/00 (2012.01)

(52) U.S. Cl.
CPC ........ G06F 16/285 (2019.01); G06F 16/9537 (2019.01); G06F 40/169 (2020.01); *G06F 16/9536* (2019.01); *G06Q 50/01* (2013.01)

(58) Field of Classification Search
CPC ............. G06F 17/30598; G06F 16/285; G06F 16/9537; G06F 40/169
See application file for complete search history.

(56) References Cited

U.S. PATENT DOCUMENTS

| | | | | |
|---|---|---|---|---|
| 8,004,618 B2* | 8/2011 | Gouhara | .............. | H04N 5/4401 348/725 |
| 8,204,974 B1* | 6/2012 | Bhattacharyya | ...... | H04L 41/142 709/223 |
| 8,849,809 B1* | 9/2014 | Seshadri | ............... | G06F 16/345 707/725 |
| 10,003,560 B1* | 6/2018 | Perkins | ................... | H04L 51/32 |
| 2002/0052870 A1* | 5/2002 | Charlesworth | ... | G06F 17/30017 707/999.001 |
| 2004/0150715 A1* | 8/2004 | Wilcock | ................. | G06Q 30/02 348/143 |
| 2012/0137081 A1* | 5/2012 | Shea | .................... | G06F 12/0897 711/145 |
| 2013/0275880 A1* | 10/2013 | Bachman | .......... | G06F 17/30017 715/751 |
| 2014/0258254 A1* | 9/2014 | Suleiman | .......... | G06F 17/30306 707/703 |

(Continued)

Primary Examiner — Ashish Thomas
Assistant Examiner — Jedidiah P Ferrer
(74) Attorney, Agent, or Firm — Keller Jolley Preece

(57) ABSTRACT

The present disclosure is directed towards systems and methods for efficiently identifying periodic trends of user-defined annotations among users of a social networking system. For example, systems and methods described herein involve grouping a set of digital content items into subsets of digital content items and performing one or more iterations of a clustering algorithm on the grouped set of digital content items to identify one or more temporal clusters of the user-defined annotation. Additionally, the systems and methods described herein involve performing one or more additional iterations of the clustering algorithm on one or more reduced sets of digital content items to identify one or more additional temporal clusters of the user-defined annotation. Further, the systems and methods involve determining that the user-defined annotation is periodic based on a time period between identified temporal clusters.

20 Claims, 12 Drawing Sheets

(56) References Cited

U.S. PATENT DOCUMENTS

| | | | |
|---|---|---|---|
| 2015/0046436 A1* | 2/2015 | Li | G06F 17/3053 |
| | | | 707/723 |
| 2016/0189171 A1* | 6/2016 | Bingham | G06Q 30/0201 |
| | | | 705/7.29 |
| 2016/0275152 A1* | 9/2016 | Gunjan | G06F 17/3071 |
| 2016/0328401 A1* | 11/2016 | Dhawan | G06F 17/30867 |

* cited by examiner

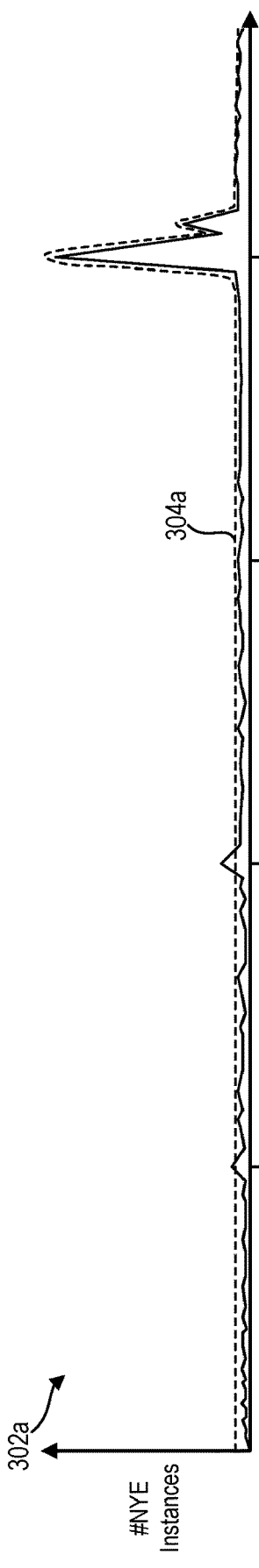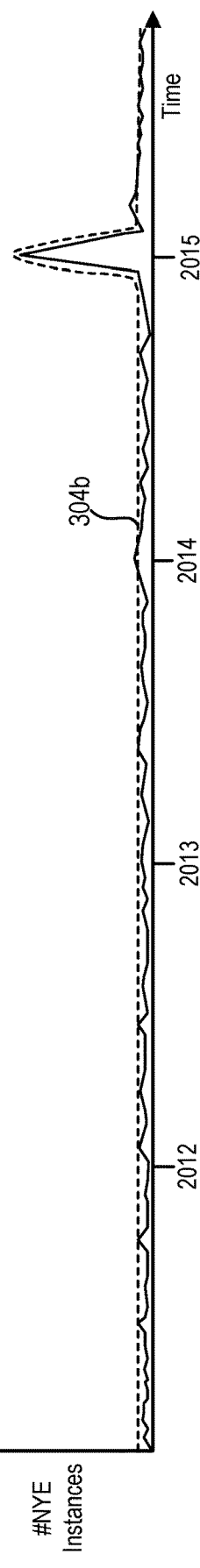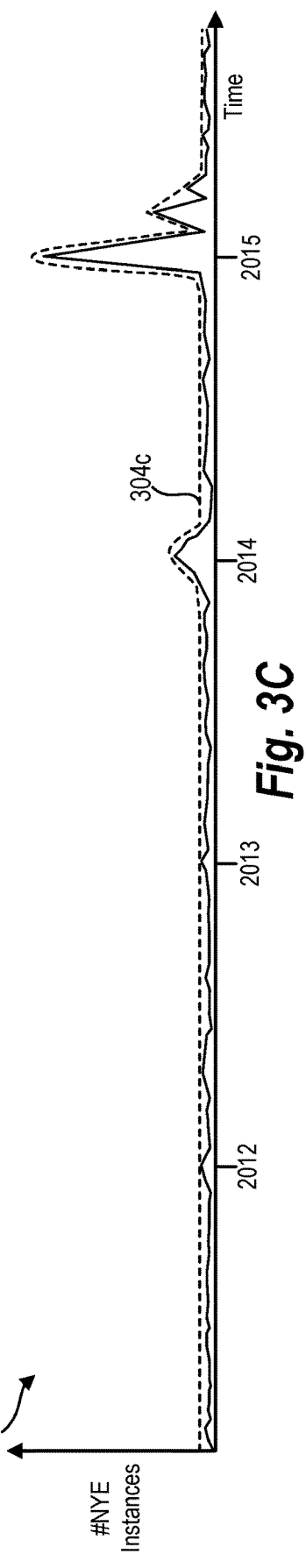

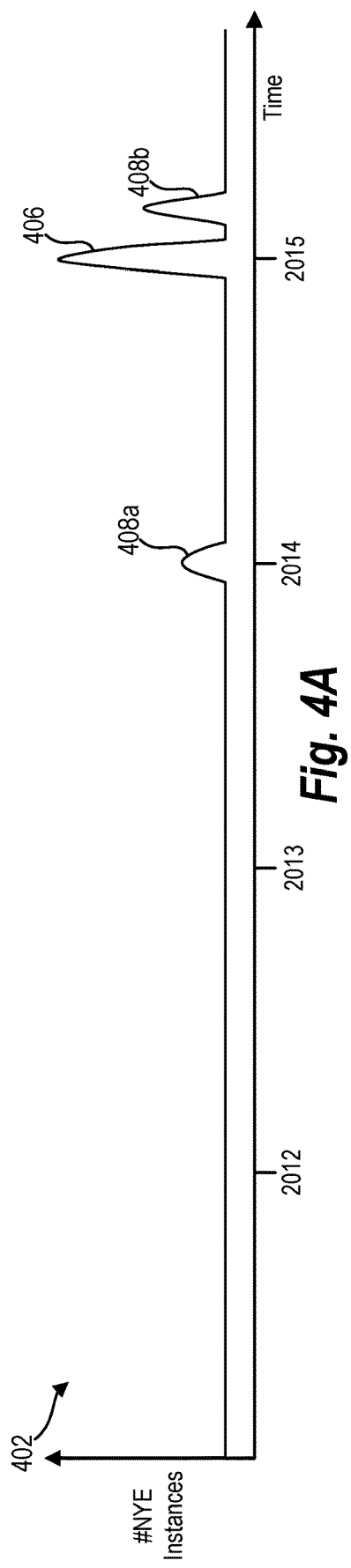
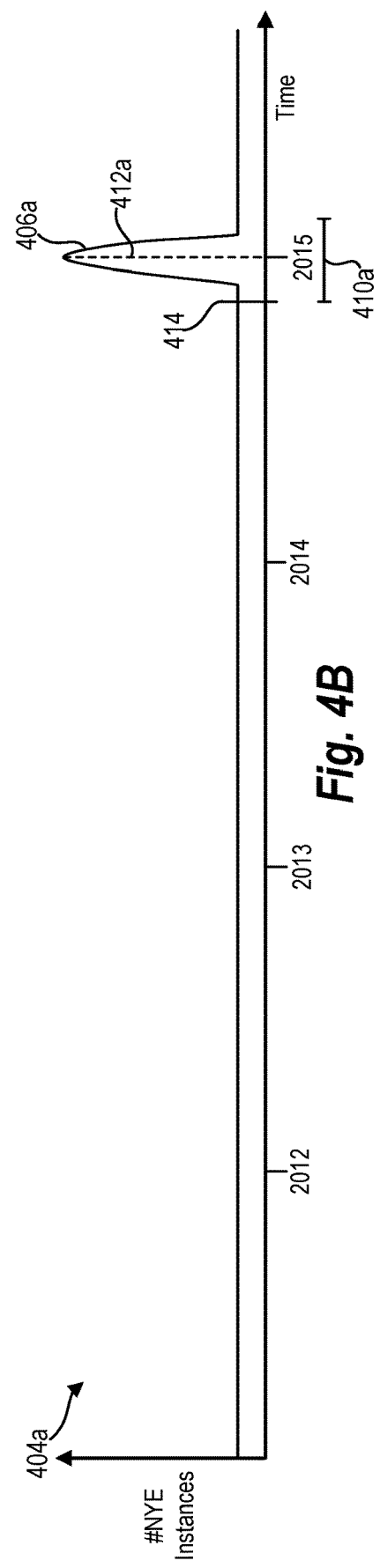

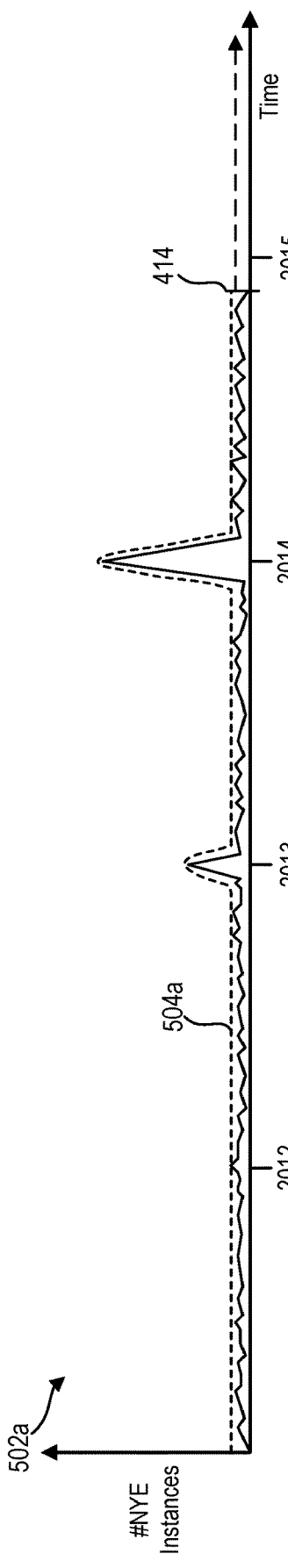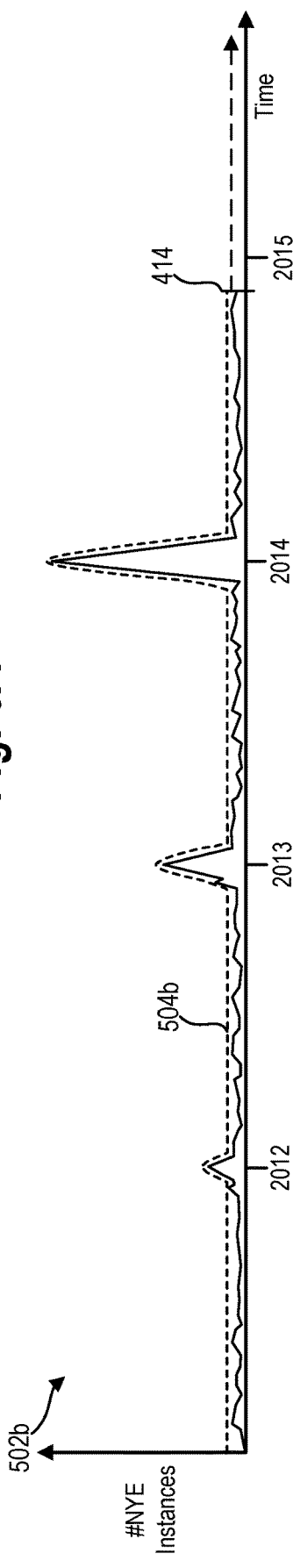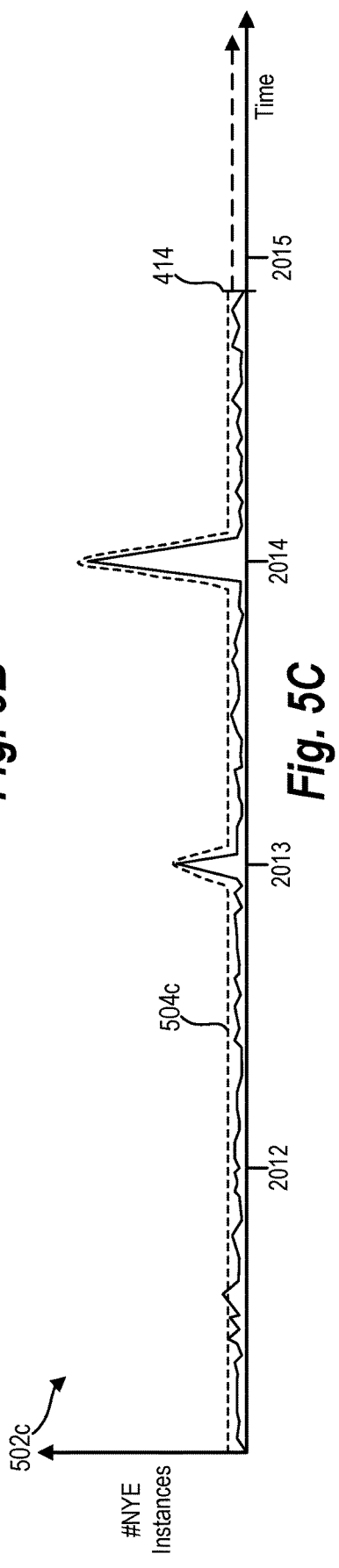

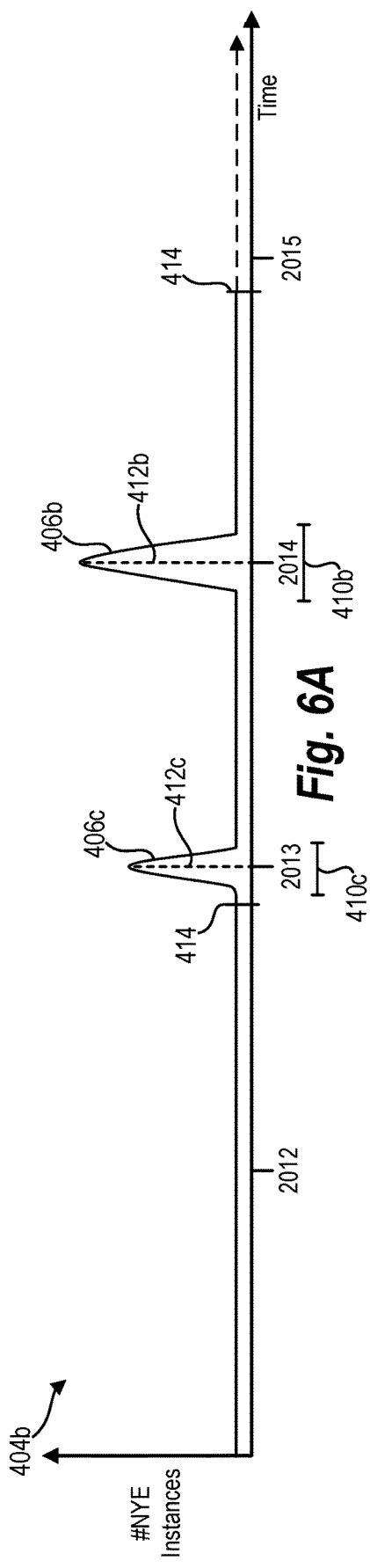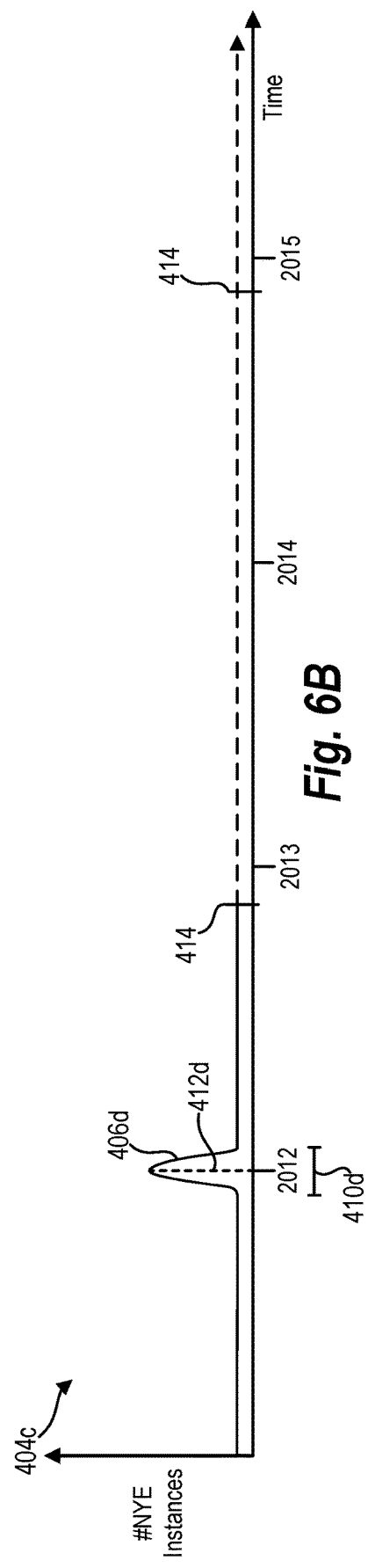

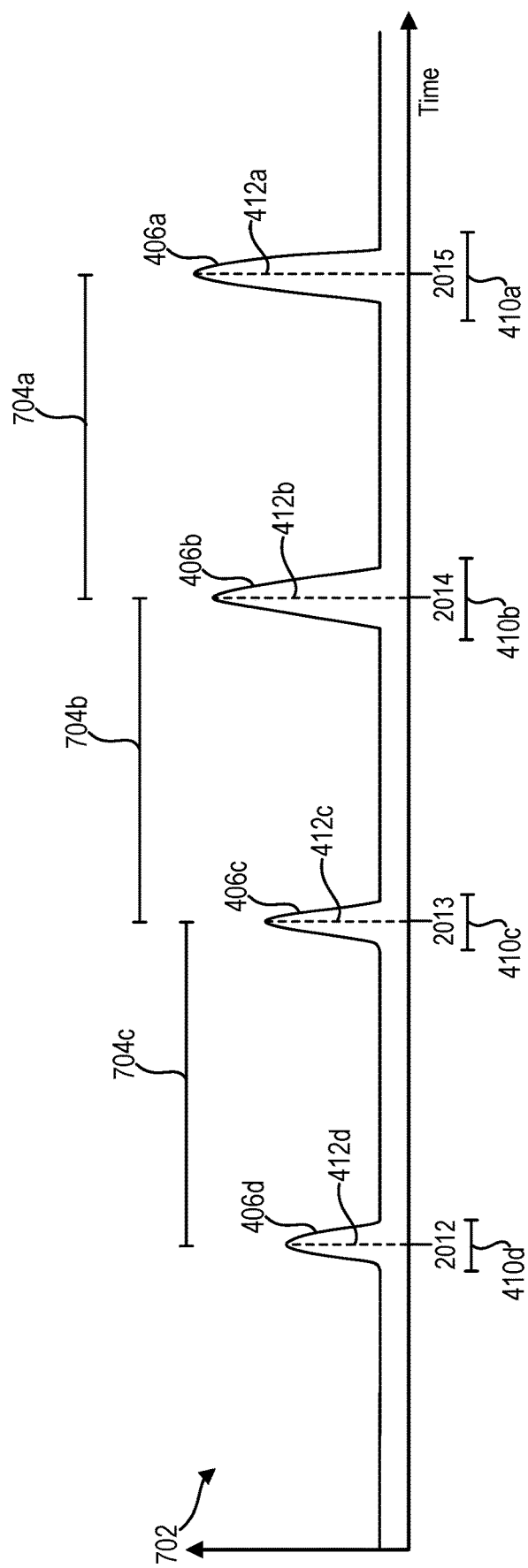

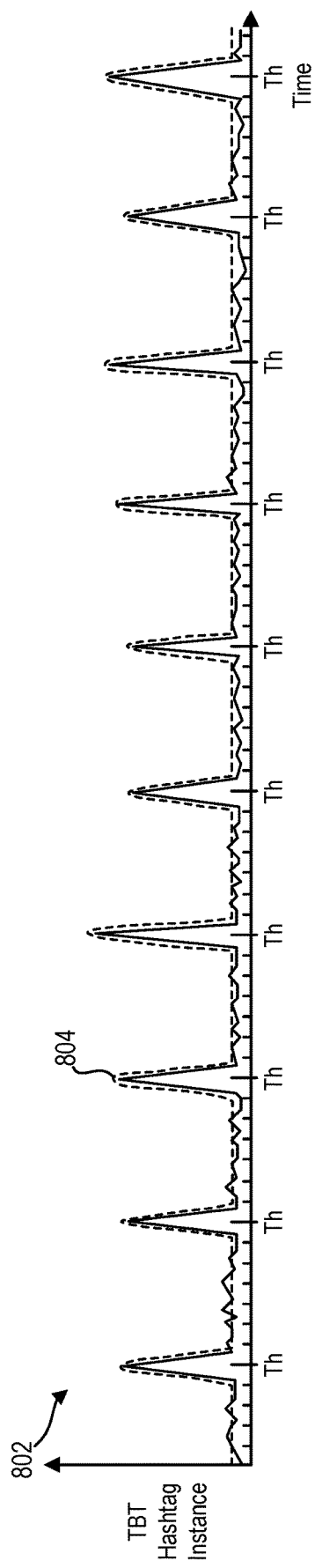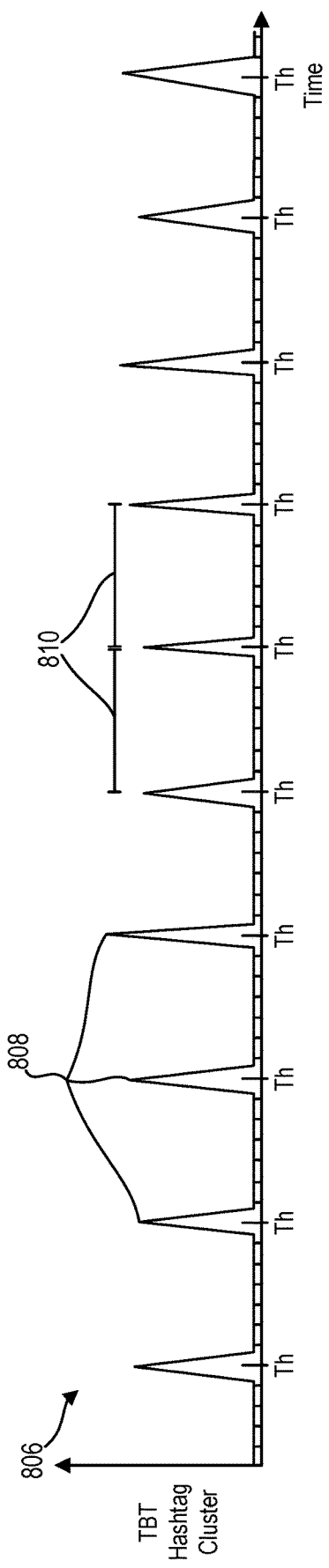

TEMPORAL CLUSTERING OF SOCIAL NETWORKING CONTENT

CROSS REFERENCE TO RELATED APPLICATIONS

N/A

BACKGROUND

1. Technical Field

One or more embodiments described herein relate generally to distinguishing between novel and non-novel social networking trends. More specifically, one or more embodiments relate to identifying periodic trends of social networking content over a period of time.

2. Background and Relevant Art

Advancements in computing devices and communication technology provide users with the ability to share user-generated content with other users via one or more communication systems. As such, users are increasingly capturing and sharing content using various computing devices. To illustrate, modern mobile devices enable users to capture digital content, such as pictures, videos, audio, and/or text to create user-generated content. A user can then share user-generated content with another user or with a group of users via a variety of communication systems (e.g., IM, text, or social networks).

Additionally, when sharing content with other users, users and/or the communication system often include tags, markers, classifiers, or other annotations with the shared content. For example, conventional communication systems often include various annotations such as, for example, hashtags, headers, subjects, timestamps, various metadata, or other characteristics that facilitate indexing shared content, identifying the shared content via searches, and/or pushing the shared content to a particular audience. Further, many conventional communication systems often identify trending content based on the tags, markers, or other annotations included with shared content (e.g., hashtags). Identifying and presenting trending content to users allows users to more conveniently view and share media content related to a topic that is trending among the user base of a communication system.

While identifying social networking trends enables users of as a social networking system to more conveniently view what content is trending at a particular time, there are a number of complications that interfere with accurate identification of novel content that is trending among users of a social networking system. As an example, widespread adoption of particular hashtags and/or other user-defined annotations often results in identifying non-novel and/or less interesting content as trending content. For example, shared content may include generic hashtags such as #throwbackthursday (e.g., #TBT) or #caturday that are frequently shared on weekly basis on a particular day of the week. These periodic and (in many cases) non-novel hashtags that trend on recurring intervals of time often interfere with bona-fide novel trends that would be more interesting to users of a communication system.

In addition to identifying non-novel content as trending, the process of identifying trending content for many conventional communications systems is an expensive process (e.g., due to the amount computing resources and time needed). In particular, the enormous amount of data that must be analyzed in order to identify a novel trending topic creates a substantial technical barrier. For example, the sheer volume of periodic hashtags, modified versions of the periodic hashtags, and the volume of new potentially trending hashtags present a substantial technical challenge to identify novel trending content within the large amount of non-trending and/or non-novel content. Therefore, identifying novel trending topics becomes an expensive and difficult process for conventional communications systems, which results in delayed presentation of trending topics, or the presentation of non-novel trending content.

Further, due to the exponential growth in the user base of many communication systems, identifying a periodic hashtags is also a significant challenge. For instance, the number of recent hashtags often dwarfs the number of similar hashtags from prior months or years. As such, identifying the periodic nature of different hashtags becomes particularly challenging when usage of a particular hashtag by a previous user base only represents a fraction of usage of the particular hashtag by a current user base. As an illustrative example, #NYE may be included in over one hundred million instances of shared content in a current year, while the previous year #NYE was only included in one million instances, where a large contributing factor to the difference is accredited to the growth of the user base. Thus, identifying the periodic nature of the #NYE based on these two years becomes difficult because compared to the one hundred million instance, the one million instances is too insignificant for conventional communication systems to identify the period nature of #NYE. As a result, conventional communication systems experience difficulty identifying new emerging periodic hashtags.

Thus, there are a number of considerations to be made in accurately identifying novel trends of shared digital content over a period of time.

SUMMARY

One or more embodiments described herein provide benefits and/or solve one or more of the foregoing and other problems in the art with systems and methods for identifying and distinguishing periodic trends of shared digital content within a communication system (e.g., a social networking system). In particular, one or more embodiments include systems and methods that analyze, using a cluster-based approach, a set of digital content items having a particular user-defined annotation. Based on the analysis, the systems and methods identify one or more temporal clusters of the particular user-defined annotation. The systems and methods further perform multiple iterations of the cluster-based analysis to identify multiple temporal clusters of the user-defined annotation. Using the identified temporal clusters of the user-defined annotation, the systems and methods determine whether the user-defined annotation is a periodic annotation (e.g., a user-based annotation that trends periodically over time).

Accordingly, the systems and methods can remove the particular user-defined annotation from the list of novel trending annotations when a particular user-defined annotation is a periodic annotation. For example, in one or more embodiments the systems and methods facilitate identification of novel annotations that are trending among users of a social networking system while minimizing interference from one or more non-novel annotations that the system has identified as a periodic annotation. For example, one or more embodiments described herein include systems and methods of identifying multiple temporal clusters of a user-defined annotation and determining a periodic score that represents the likelihood that the user-defined annotation is a periodic annotation. Using the periodic score, the systems and methods can more efficiently distinguish between novel annotations and non-novel periodic annotations when identifying trending annotations within the social networking system.

Additionally, in one or more embodiments, the systems and methods enable identifying of social networking trends over various periods of time while accounting for a rapidly growing user base of the social networking system. For example, one or more embodiments described herein involve performing a first iteration of a clustering analysis to identify one or more temporal clusters of user-defined annotation for a set of digital content items that span over multiple months or years. Additionally, one or more embodiments involve performing one or more additional iterations of the clustering analysis to identify one or more temporal clusters of user-defined annotations for one or more reduced sets of digital content items. Performing the additional iterations on the reduced sets of digital content items enables the systems and methods to account for the growing user base of the social networking system and/or increased use of various annotations over time.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other marketing features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and marketing features, a more particular description will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, various embodiments will be described and explained with additional specificity and detail through the use of the accompanying drawings in which:

FIGS. 3A-3C illustrate example graphical representations showing subsets of instances of digital content items having a user-defined annotation;

FIGS. 4A-4B illustrate example graphical representations showing identified clusters of the instances of digital content items having the user-defined annotation;

FIGS. 5A-5C illustrate example graphical representation showing reduced subsets of instances of digital content items having the user-defined annotation;

FIGS. 6A-6B illustrate example graphical representations showing identified additional clusters of the instances of digital content items having the user-defined annotation;

FIG. 7 illustrates an example graphical representation showing identified clusters of the instances of digital content items having the user-defined annotation;

FIGS. 8A-8B illustrates example graphical representations showing identified instances and clusters of user-defined annotations;

DETAILED DESCRIPTION

Figure 1:
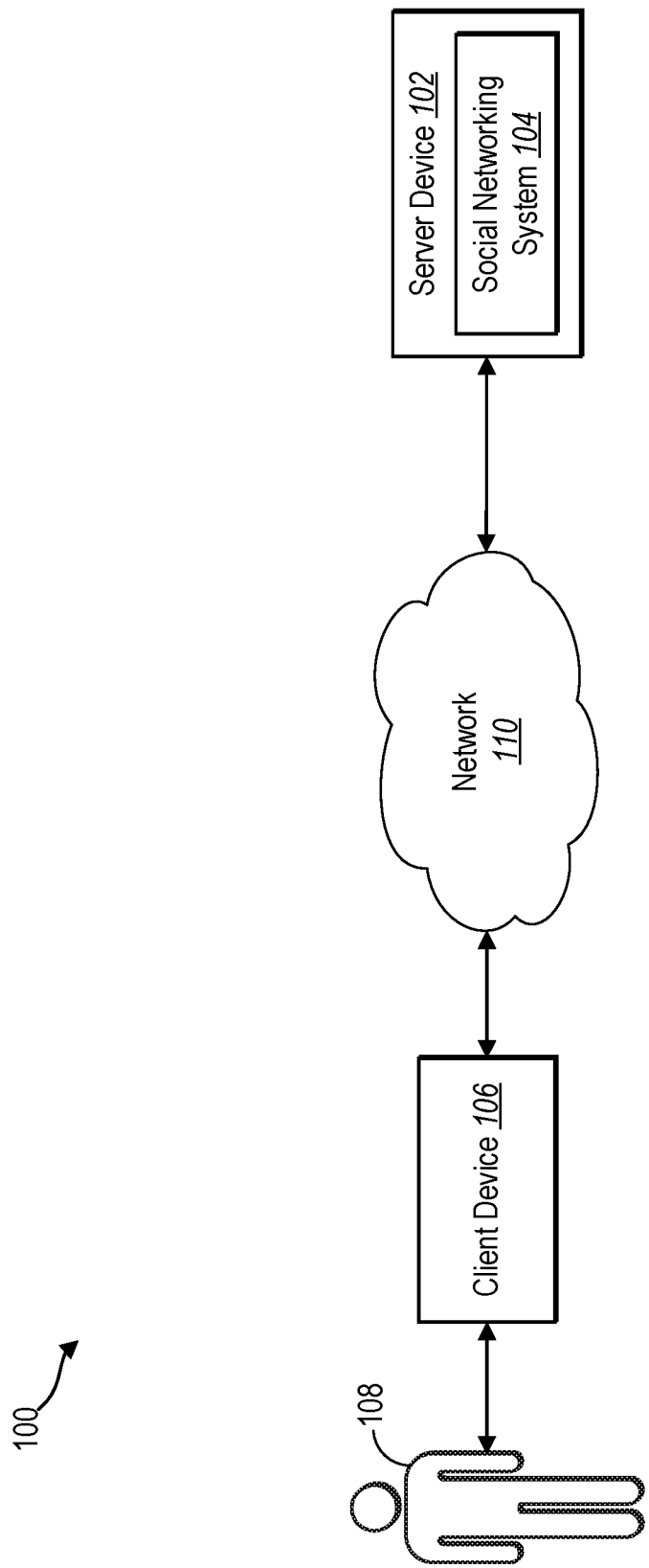
FIG. 1 illustrates a block diagram of an environment in which the methods and systems disclosed herein may be implemented in accordance with one or more embodiments.

One or more embodiments described herein include a social networking system that identifies periodic trends of digital content shared by users of the social networking system. In one or more embodiments, the social networking system groups a set of digital content items associated with timestamps having a user-defined annotation into randomized subsets of digital content items having the user-defined annotation. Further, the social networking system can perform a first iteration of a clustering algorithm to identify one or more temporal clusters of user-defined annotations for the set of digital content items (e.g., for each of the randomized subsets of digital content items). The social networking system can further group a reduced set of digital content items having the user-defined annotation into reduced subsets of digital content items having the user-defined annotation, where the reduced set of digital content items does not include the one or more temporal clusters identified in the first iteration. The social networking system can further perform one or more additional iterations of the clustering algorithm to identify one or more additional temporal clusters of the user-defined annotation for the reduced set of digital content items. Upon identifying multiple temporal clusters, the social networking system can determine a periodicity for the user-defined annotation based on a time period between the temporal clusters.

Using the periodicity for user-defined annotations, the social networking system can efficiently identify novel annotations that are trending among users of the social networking system by identifying user-defined annotations that periodically trend over different periods of time (e.g., days, weeks, months, years). In particular, the social networking system can identify periodic trends of user-defined annotations that tend to be uninteresting (e.g., non-novel annotations) and distinguish trending bona-fide novel user-defined annotations from the periodic user-defined annotations. For example, upon identifying that a user-defined annotation is periodic or otherwise regularly recurring, the social networking system can place the user-defined annotation and/or related tags on a blacklist of annotations to not consider when identifying trending annotations among users of the social networking system. As such, the social networking system can identify trending user-defined annotations and other digital content item characteristics while discarding thousands or even millions of digital content items having periodic annotations that are on the blacklist.

Further, in identifying periodic trends, the social networking system can account for changes in the amount of users in the user base (e.g., user base growth) and/or increased use frequency of a particular annotation over time. For example, in one or more embodiments, the social networking system uses an iterative process to identify a first temporal cluster within a set of digital content items. Then, after identifying the first temporal cluster, the instances of digital content items within the first temporal cluster are removed from the set of digital content items to create a reduced set of digital content items. The social networking system can then perform a second iteration to identify a second temporal cluster. Accordingly, the social networking system can perform a third iteration on a further reduced set of digital content items that does not include the digital content items identified in the first and second temporal clusters. The iterative process can continue until no further temporal clusters are identified.

Due to the iterative process that includes removing the digital content items that are within multiple temporal clusters, the social networking system effectively can account for varying user base size and/or varying popularity of annotations over time. For example, the first temporal cluster discussed in the preceding paragraph can include X number of digital content items, while the second temporal cluster includes a fraction of X. Depending on the value of X (e.g., 100 million), if the digital content items in the first temporal cluster are not removed to perform a second iteration, the second temporal cluster would likely be indistinguishable (e.g., would appear as noise) compared to the spike of the first temporal cluster. Therefore, by performing the clustering analysis using an iterative process on sequentially reduced sets of the digital content items, the social networking system can identify one or more additional temporal clusters that most conventional systems would fail to identify.

Additionally, the social networking system can efficiently utilize resources of the social networking system by grouping a set of digital content items having a user-defined annotation into groups of a predefined number of timestamps corresponding to the digital content items and performing the clustering algorithm on the groups of timestamps. In this way, the social networking system can perform the clustering algorithm on manageable portions of the digital content items to identify clusters of user-defined annotations for the set of digital content items. Moreover, and as will be described in greater detail below, upon identifying a cluster of user-defined annotations, the social networking system can exclude portions of the set of digital content items corresponding to the identified cluster, group the reduced portions of the set of digital content items into reduced subsets of digital content items, and perform one or more additional iterations of the clustering algorithm without considering the digital content items of the previously identified cluster. In this way, the social networking system can efficiently utilize resources by identifying one or more additional clusters without considering or otherwise analyzing previously identified clusters of user-defined annotations.

As used herein, the term "digital content item" or "digital content" refers to any digital media of any kind. For example, a digital content item can include, but is not limited to, any audio, video, image, or other digital data (in isolation or in combination) that may be shared or otherwise transmitted. In one or more embodiments, for example, a digital content item includes a digital photo that a user captures using a camera on a computing device and shares with other users of a social networking system. As another example, a digital content item can include an audio file that a user captures using a microphone on a computing device. A digital content item can originate from any source. For instance, a user can capture a digital content item with a computing device, receive a copy of a digital content item from a second device, or simply download a digital content item from the Internet. Moreover, a digital content item can include one or more user-identified annotations or other content item characteristics.

As used herein, a "user-defined annotation" refers to an annotation, classifier, or other characteristic that a user associates with one or more digital content items. For example, a user-defined annotation may include, but is not limited to, a hashtag, a title, a link, a subject line, a topic, a string of text, a photo tag, file characteristic, metadata, or other characteristic associated with one or more digital content items that is defined by the user. In one or more embodiments, the user-defined annotation refers to a hashtag, subject line, string of text, link, or other annotation that is composed or otherwise included by a user within or together with an associated digital content item and which is visible to other users of the social networking system that access the associated digital content item. Alternatively, in one or more embodiments, the user-defined annotation refers to metadata or other characteristic that is included within the digital content item, but not necessarily visible to other users of the social networking system that access the associated digital content item. Moreover, in one or more embodiments, the user-defined annotation can refer to a particular combination of user-defined annotations associated with one or a combination of digital content items.

FIG. 1 illustrates a schematic diagram of a system 100 within which one or more systems and methods described herein can be implemented. As illustrated in FIG. 1, the system 100 includes a server device 102 that implements a social networking system 104, a client device 106, and a corresponding user 108 of the client device 106. Further, the server device 102 and client device 106 can communicate over a network 110. Although the system 100 of FIG. 1 illustrates a particular arrangement of the server device 102, social networking system 104, client device 106, user 108, and network 110, the system can include alternative configurations. For example, the system 100 can include any number of server devices that implement the social networking system 104. Additionally, the system 100 can include any number of client devices 106 and a corresponding number of users 108. Further, in one or more embodiments, the server device 102 communicates directly with the client device 106 or social networking system 104 by passing the network 110.

The client device 106, the network 110, and the server device 102 can communicate using any communication platforms and technologies suitable for transporting and/or otherwise communicating signals and data, including any known communication technologies, devices, media, and protocols supporting of remote data communications, examples of which will be described in more detail below with respect to FIGS. 10-11. In addition, the network 110 may represent a network or collection of networks (such as the Internet, corporate intranet, virtual private network (VPN), local area network (LAN), wireless local network (WLAN), cellular network, wide area network (WAN), metropolitan area network (MAN), or a combination of multiple networks). Thus, the network 110 can include any suitable network over which the client device 106 can access the server device 102 or visa versa. Additional details and examples of networks are described below in connection with FIGS. 10-11.

Additionally, as will be described in greater detail below with regard to FIGS. 11-12, the user 108 may represent one or more users of a social networking system 104. For example, the user 108 may refer to a single user or multiple users associated with a particular entity that communicates with one or more other users over a platform supported by the social networking system 104. The user 108 can receive and/or access digital content shared by other users of the social networking system 104. Likewise, the user 108 can share digital content with other users of the social networking system 104. For example, the user 108 can cause the client device 106 to capture, create, or otherwise obtain one or more digital content items. Likewise, the user 108 can cause the client device 106 to share the digital content item(s) with other users of the social networking system 104.

In addition to sharing digital content with other users, the user 108 and/or other users of the social networking system 104 can associate one or more user-defined annotations with one or more digital content items. As an example, the user 108 can include a hashtag with a digital content item that is shared with other users of the social networking system 104. In one or more embodiments, the user 108 includes the hashtag within a content portion of a digital content item. For example, the user 108 can include one or more hashtags including a "#" sign and a string of text within a text portion of a shared post within the social networking system 104.

Moreover, while one or more embodiments described herein relate specifically to associating user-defined hashtags with one or more digital content items, it is appreciated that the user 108 can associate one or more additional or alternative types of user-defined annotations with digital content items that are shared with users of the social networking system 104. As such, one or more embodiments that are described in connection with associated hashtags and digital content items can similarly apply to digital content items and other types of user-defined annotations. For example, the user 108 can similarly associate a topic, subject line, tags of people (e.g., photo tags), location tags, user-defined metadata, or other characteristics of a digital content item that is defined by the user 108 and provided to the social networking system 104 with the associated digital content item. In one or more embodiments, the social networking system can automatically generate and associate an annotation with a shared digital content item based on one or more characteristics of the digital content item and/or based on user preferences.

In addition to enabling a user 108 to associate a user-defined annotation with a digital content item, the system 100 can further enable the social networking system 104 to identify one or more user-defined annotations that are trending among users of the social networking system 104. For example, if the user 108 and many other users each associate a particular hashtag with shared digital content items over a period of time, the social networking system 104 can identify the hashtag as a trending user-defined annotation and promote the associated digital content items to other users of the social networking system 104. Additionally, or alternatively, the social networking system 104 can push the digital content items associated with trending user-defined annotation to a particular group of users that have an interest in the hashtag or related hashtags that the user 108 and other users include with the digital content item.

Furthermore, as will be described in more detail below, the system 100 can facilitate identification of one or more periodic user-defined annotations that would otherwise interfere with identification of bona-fide novel user-defined annotations. For example, the social networking system 104 can perform a clustering algorithm on a collection of digital content having a common hashtag to identify one or more clusters of hashtags over a period of time for the collection of digital content items. Additionally, the social networking system 104 can determine a periodicity of the hashtag by determining whether the identified clusters occur at periodic intervals. Further, the social networking system 104 can identify that the hashtag is a periodic or recurring hashtag based on the time between the periodic intervals. Upon determining that the hashtag is a periodic hashtag, the social networking system 104 can determine or receive instructions (e.g., from the user 108 or other entity) to discard the hashtag in calculating other trending hashtags among users of the social networking system 104. Alternatively, the social networking system 104 can determine or receive instructions to include the periodic hashtag in calculating or predicting trending hashtags among users of the social networking system 104.

Figure 2:
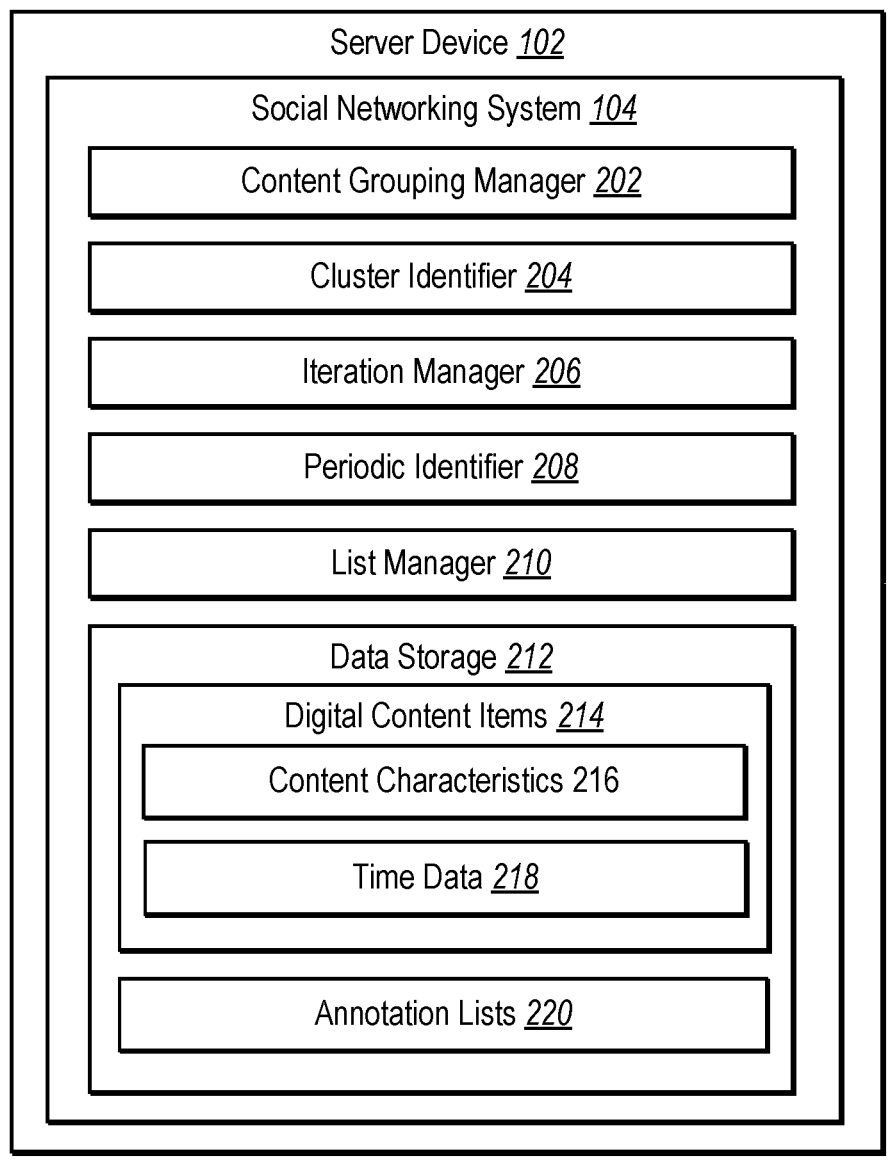
FIG. 2 illustrates a schematic diagram of the server device of FIG. 1 in accordance with one or more embodiments.

FIG. 2 illustrates an example embodiment of a server device 102 and social networking system 104 in accordance with one or more embodiments of the system 100. As shown in FIG. 2 the social networking system 104 includes a content grouping manager 202, cluster identifier 204, iteration manager 206, periodic identifier 208, list manager 210, and data storage 212. Further, as shown in FIG. 2, the data storage 212 includes digital content 214 having content characteristics 216 and time data 218. Additionally, the data storage 212 includes one or more annotation lists 220 that enable the social networking system 104 to distinguish and apply different rules to digital content items having different content characteristics 216 (e.g., user-defined annotations).

Although the server device 102 illustrated in FIG. 2 shows the components 202-212 to be separate, any of the components 202-212 may be combined into fewer components, such as into a single facility module, or divided into more components as may serve one or more embodiments. In addition, the components 202-212 may be located on, or implemented by, one or more servers or other computing devices, such as those described below in relation to FIG. 10. For example, as shown in FIG. 2, the social networking system 104 may be implemented on a server device 102.

The components 202-212 can comprise software, hardware, or both. For example, the components 202-212 can comprise one or more instructions stored on a computer readable storage medium and executable by a processor of one or more computer devices. When executed by the one or more processors, the computer-executable instructions of the social networking system 104 can cause a computing device(s) to perform the methods described herein. Alternatively, the components 202-212 can comprise hardware, such as a special-purpose processing device to perform a certain function. Additionally or alternatively, the components 202-212 can comprise a combination of computer-executable instructions and hardware.

As mentioned above, the social networking system 104 (hereinafter "system 104") can perform various tasks and functions that provide tools and services for reliably and efficiently identifying user-defined annotations that are trending among users of the system 104. For example, the server device 102 can receive any number of digital content items having associated user-defined annotations and timestamps from various users of the system 104. The system 104 can identify trends of user-defined annotations that are included within or otherwise associated with the shared digital content items. Further, as will be described in greater detail below, the system 104 can identify periodic trends of user-defined annotations included with (or within) shared digital content items and identify various trends of user-defined annotations among users of the system 104.

In realizing features and functionality related to identifying trends of user-defined annotations over time, the system 104 includes a content grouping manager 202 that accesses a set of digital content items having an associated user-defined annotation. In one or more embodiments, the set of digital content items includes a collection of all digital content items having the user-defined annotation and timestamps that span over a defined period of time. Alternatively, the set of digital content items can include a predefined sample size of digital content items having the user-defined annotation over the defined period of time. In one or more embodiments, the set of digital content items includes digital content items having an identical user-defined annotation for each of the digital content items. Alternatively, the set of digital content items can include a collection of digital content items having one or more user-defined annotations that the system 104 has identified as similar or related.

Upon accessing, receiving, or otherwise obtaining a set of digital content items having a user-defined annotation, the content grouping manager 202 can group the set of digital content items into subsets of the digital content items that include the user-defined annotation. In one or more embodiments, the content grouping manager 202 groups the set of digital content items into subsets of a predefined number of instances of user-defined annotations for the set of digital content items. For example, in one or more embodiments, the content grouping manager 202 groups the set of digital content items into subsets by generating groups of 10,000 instances of the user-defined annotation. The content grouping manager 202 can generate a predefined number of groups (e.g., 10, 100) or assign the instances of the user-defined annotation for the set of digital content items into as many groups of 10,000 instances (or any other predefined number) as the set of digital content items permits. For example, the content grouping manager 202 can generate as many subsets of 10,000 instances of the user-defined annotation until all instances of the user-defined annotation from the set of digital content items are assigned into similarly sized groups.

In assigning digital content items to subsets, the content grouping manager 202 can use a randomized grouping process. For example, the content grouping manager 202 can assign the digital content items into subsets across random timestamps over any predefined period of time. In one or more embodiments, the content grouping manager 202 groups the digital content items using random timestamps that span over the entire duration of time to which the set digital content items corresponds. Alternatively, the content grouping manager 202 can group the digital content items using random timestamps that span over a limited period of time (e.g., ten weeks, one year, three years).

In one or more embodiments, the content grouping manager 202 groups the digital content items according to a periodic interval that the system 104 is attempting to identify or confirm. For example, if the system 104 is attempting to identify a periodic interval of a year, the content grouping manager 202 can group the digital content items using random timestamps that span over the previous three years. Alternatively, if the system 104 is attempting to identify a periodic interval of a month, the content grouping manager 202 can group the digital content items using random timestamps that span over the past year. As an additional example, if the system 104 is attempting to identify a periodic interval of a week, the content grouping manager 202 can group the digital content item using random timestamps that span over the previous ten weeks.

Upon grouping the set of digital content items into subsets of digital content items having the user-defined annotation, the cluster identifier 204 can identify one or more clusters of the user-defined annotation for each of the subsets of digital content items. For example, the cluster identifier 204 can perform a clustering algorithm on each of the subsets of digital content items to identify one or more temporal clusters within each of the grouped subsets of digital content items. Thus, where the set of digital content items is assigned into randomized subsets, the cluster identifier 204 can perform the clustering algorithm on each of the randomized subsets to identify one or more clusters of digital content items at one or more periods of time associated with the randomized subsets (e.g., using a timestamp associated with each digital content item).

In one or more embodiments, the cluster identifier 204 uses a density-based spatial clustering of applications with noise (DBSCAN) algorithm to analyze and identify clusters of user-defined annotations around one or more timestamps. For example, the cluster identifier 204 can perform the DBSCAN algorithm on a subset of 10,000 instances of the user-defined annotation to identify a threshold number of user-defined annotations within the subset that fall within one or more neighborhoods of timestamps. While one or more embodiments described herein relate specifically to performing a DBSCAN algorithm to identify one or more temporal clusters, it is appreciated the cluster identifier 204 can use various models and algorithms to identify clusters of data. For example, the cluster identifier 204 can use various connectivity models, centroid models, distribution models, density models, subspace models, group models, graph-based models, or other clustering algorithm model that can be used to identify one or more temporal clusters of a user-defined annotation across a predefined range of timestamps corresponding to the set or subset of digital content items being analyzed.

As mentioned above, the cluster identifier 204 can perform a DBSCAN algorithm on a subset of instances of the user-defined annotation to identify one or more temporal clusters of the user-defined annotation across a range of time. In performing the DBSCAN algorithm, the cluster identifier 204 can determine, receive, or otherwise access an epsilon value ($\epsilon$) that defines a distance (of time) between timestamps associated with each digital content item. Additionally, the cluster identifier 204 can determine, receive, or otherwise access a threshold value of instances of user-defined annotations that, if contained within a range of timestamps, define a temporal cluster of the user-defined annotation. Using the $\epsilon$ and threshold values, the cluster identifier 204 can visit specific timestamps, ranges of timestamps, and/or individual digital content items having particular timestamps to identify a cluster of the user-defined annotation that includes a number of instances of the user-defined annotation that is greater than or equal to the threshold number of instances of the user-defined annotation whose timestamps are individually or collectively separated by less than the $\epsilon$ value.

For example, the cluster identifier 204 can analyze a subset of instances of user-defined annotations for the set of digital content items and identify a group of user-defined annotations including more instances than the threshold number of instances of the user-defined annotation whose timestamps are each separated by less than $\epsilon$. As another example, the cluster identifier 204 can analyze the subset of instances of the user-defined annotation and identify a group of instances of the user-defined annotation that includes more than the threshold number of instances of the user-defined annotation that all fall within a range of timestamps defined by ε.

Using the DBSCAN algorithm, the cluster identifier 204 can classify each instance of the user-defined annotation within the subset as either part of a cluster or noise. In particular, the cluster identifier 204 classifies those digital content items that fall within the range of timestamps defined by ε and the threshold value as clustered user-defined annotations. Additionally, the cluster identifier 204 can classify any digital content items that fall outside the range of timestamps in the identified clusters as noise.

Upon identifying clusters and classifying digital content items as clusters or noise, the cluster identifier 204 can combine the results of the clustering algorithm (e.g., DBSCAN) for each of the subsets of digital content items and generate a representation of the set of digital content items that includes all identified clusters and noise. In one or more embodiments, the cluster identifier 204 combines all of the clusters and ignores the noise. In this way, the cluster identifier 204 can identify one or more clusters of a user-defined annotation based on the consolidated results of the clustering algorithm performed on the various subsets. The cluster identifier 204 can determine whether identified clusters represent false positives (e.g., a cluster is only identified for one subset, but not for all or most of the subsets) while confirming clusters that have been consistently identified across a greater portion (e.g., a threshold portion) or all of the subsets representative of the set of digital content items.

In addition to combining the results of the clustering algorithms on the randomized subsets, the cluster identifier 204 can compare the results of the identified clusters and identify a time around which the one or more identified clusters is centered. For example, the cluster identifier 204 can identify a timestamp or range of timestamps that represents the center of mass, midpoint, or other information about the identified cluster as a whole. Additionally, the cluster identifier 204 can analyze the distribution of the identified cluster(s) and determine characteristics of the cluster(s) such as midpoint, average, quartile ranges, etc. As will be explained in greater detail below, the periodic identifier 208 can use the time around which the one or more identified clusters are centered to determine a periodicity of a user-defined annotation.

In addition to the cluster identifier 204, and as shown in FIG. 2, the system 104 also includes an iteration manager 206 that manages performance of one or more iterations of the clustering algorithm on the set of digital content items to identify temporal clusters. For example, as described above, the content grouping manager 202 and cluster identifier 204 can perform a first iteration of a clustering algorithm on a set of digital content items by grouping the set of digital content items into subsets of digital content items and performing the clustering algorithm on each of the subsets of digital content items. Additionally, as described above, the content grouping manager 202 and cluster identifier 204 can identify one or more temporal clusters within the set of digital content items. Further, upon performing the first iteration of the clustering algorithm and identifying one or more temporal clusters, the iteration manager 206 can cause the content grouping manager 202 and cluster identifier 204 to perform one or more additional iterations to identify any number of additional temporal clusters of user-defined annotations from the set of digital content items.

For example, upon performing the first iteration of the clustering algorithm, the iteration manager 206 can identify a new set of digital content items from the noise identified from the first iteration of the clustering algorithm. Additionally, the iteration manager 206 can cause the content grouping manager 202 and cluster identifier 204 to perform a second iteration of the clustering algorithm on the new set of digital content items. In particular, as will be described in greater detail below, the iteration manager 206 can generate, create, or otherwise identify a reduced set of the digital content items representative of a reduced portion of the original set of digital content items having the user-defined annotation (e.g., the original set of digital content items less the digital content items identified within a temporal cluster). Upon identifying the reduced portion of the digital content items, the iteration manager 206 can enable the content grouping manager 202 and cluster identifier 204 to group the reduced portion of the digital content items into subsets (e.g., reduced subsets) of digital content items and perform the clustering algorithm on the subsets of the digital content items similar to the process described above in connection with the first iteration.

As will be described in greater detail below, the iteration manager 206 can cause the content grouping manager 202 and the cluster identifier 204 to perform any number of iterations of the clustering algorithm to identify any number of temporal clusters across a period of time. In one or more embodiments, the iteration manager 206 causes the system 104 to perform a predefined number of iterations to identify multiple temporal clusters. For example, the iteration manager 206 can cause the content grouping manager 202 and cluster identifier to perform five iterations of the clustering algorithm on gradually reduced sets of digital content items to identify any number of temporal clusters. Alternatively, in one or more embodiments, the iteration manager 206 causes the system 104 to perform any number of iterations until a threshold number of temporal clusters have been identified or until an iteration of the clustering algorithm on the subsets of digital content items fails to identify a temporal cluster. In one or more embodiments, the iteration manager 206 identifies a threshold number of temporal clusters based on a period of time (e.g., days, weeks, months, years) between one or more identified clusters.

As shown in FIG. 2, the system 104 further includes a periodic identifier 208 that identifies a periodicity of one or more user-defined annotations based on a distance between identified temporal clusters. In particular, periodic identifier 208 identifies a periodicity by calculating or otherwise identifying a distance between the identified clusters to determine if the identified clusters recur at regular time intervals. Further, if the identified clusters recur at regular intervals, the periodic identifier 208 can determine the periodicity by determining whether the intervals correspond to a period of time that would correspond to a periodic interval. For example, the periodic identifier 208 can determine that the identified clusters of the user-defined annotation regularly recurs every week, month, or year, and accordingly identify a periodic interval corresponding to the distance between each of the recurring intervals.

It is appreciated that the periodic identifier 208 can identify periodic intervals of various types. For example, the periodic identifier 208 can identify common time intervals including hours, days, weeks, months, or years that depend strictly on a difference between timestamps of temporal clusters. Additionally, the periodic identifier 208 can identify other intervals such as, for example, lunar intervals or intervals corresponding to various calendars. For example, the periodic identifier 208 can receive, access, or otherwise obtain information from different geographic regions and identify if clusters are occurring at regular intervals in accordance with particular holidays for a particular geographic region. In one or more embodiments, the periodic identifier 208 can consider geolocation information (e.g., geolocation metadata) associated with clustered digital content items to identify one or more intervals that would be applicable to various regions. Thus, the period identifier 208 can consider information in addition to the difference in timestamps between identified clusters in determining the periodicity for a user-defined annotation.

As shown in FIG. 2, the system 104 further includes a list manager 210 that manages one or more lists of annotations that may be associated with one or more digital content items. For example, the list manager 210 can manage a blacklist of annotations including one or more user-defined annotations that the system 104 can ignore or disregard when analyzing shared digital content and identifying trending hashtags, topics, or other user-defined annotations among various users of the system 104. As such, the system 104 can identify trending user-defined annotations (e.g., hashtags) while ignoring digital content items having blacklisted annotations and thus preserve processing power to more efficiently analyze trending user-defined annotations and perform other functionality of the system 104. Further, the list manager 210 can prevent certain periodic annotations from dominating trending topics and preventing the system 104 from identifying more unique or bona-fide novel user-defined annotations.

Additionally or alternatively, in one or more embodiments, the list manager 210 manages a whitelist of annotations including one or more user-defined annotations that the system 104 can positively identify as trending among users of the system 104. In particular, the list manager 210 can facilitate anticipating or predicting that a user-defined annotation will be trending at a particular time among users of the system 104 and pre-emptively identify the user-defined annotation as trending at particular times. In one or more embodiments, the list manager 210 utilizes the whitelist to more accurately measure models and correlations between trending topics and related product purchases or ensure that particular topics are trending at various times among social networking users.

In one or more embodiments, the list manager 210 maintains or otherwise manages different blacklists and/or whitelists that vary among different users of the system 104. For example, the list manager 210 can maintain region-specific blacklists and/or whitelists specific to different timestamps and/or geolocation information. For example, where a region-specific holiday results in a user-defined annotation to trend among users of a particular region, the list manager 210 can either prevent or push that trend to users of that region while doing the opposite for users of another region. For instance, the hashtag #fourthofjuly may trend among users within the United States every July fourth and have a particular interest to users in the United States without carrying the same level of interest among users outside the United States. Thus, the list manager 210 may either whitelist or blacklist #fourthofjuly (and related hashtags) among users in the United States while doing something different for users outside the United States.

Additionally, the list manager 210 can selectively blacklist or whitelist (e.g., maintain separate blacklists or whitelists) at different times across different regions. For example, where #NYE or #newyearseve may trend around midnight in one time zone, the same hashtag (or related hashtags) may prematurely trend or trend for too long in different time zones. Thus, the list manager 210 can maintain a blacklist that prevents particular topics from trending too early for some time zones while preventing the same topics from trending too late for other time zones. Alternatively, the list manager 210 can maintain a whitelist that anticipates trending topics at different times across different time zones.

Moreover, the list manager 210 can add and/or remove user-defined annotations in a variety of ways. For example, in one or more embodiments, the list manager 210 adds a user-defined annotation to the blacklist in response to determining that the user-defined annotation is a periodic annotation. Additionally, the list manager 210 can add one or more related annotations (to the periodic annotation) to the blacklist in response to detecting that the user-defined annotation trends periodically among users of the system 104. In one or more embodiments, the list manager 210 provisionally adds a user-defined annotation to a list of periodic annotations for the user 108, the system 104, or other user (e.g., administrator) to review and identify (e.g., manually via a user input) the user-defined annotation as an annotation to add to the blacklist, whitelist, or to not add to any list.

Further, as mentioned above, and as illustrated in FIG. 2, the system 104 includes a data storage 212 including digital content 214 having content characteristics 216 and associated time data 218. In particular, the digital content 214 can include any number of digital content items shared by users of the social networking system 104. The digital content 214 can further include any digital content items accessible to the system 104 on the server device 102 and/or accessible to the server device 102 via one or more client devices or other computing devices. Further, as shown in FIG. 2, the digital content 214 can include content characteristics 216 including information about individual digital content items. For example, the content characteristics 216 can include one or more user-defined annotations or other annotations associated with respective digital content items. Further, the digital content 214 can include time data 218 associated with respective digital content items. The time data can include timestamps or other information associated with when digital content is created, shared, or otherwise communicated from a client device or the server device 102. Moreover, in one or more embodiments, the digital content 214 further includes geolocation information and other data associated with respective digital content items.

Additionally, as shown in FIG. 2, the data storage 212 can include one or more annotation lists 220. For example, the data storage 212 can include one or more blacklists or whitelists, each including one or more one or more annotations (e.g., user-defined annotations) associated with applicable rules. For example, the annotation lists 220 include one or more blacklists that the system 104 ignores when determining trends among users of the system 104. For example, a black list can include a list of hashtags that the system 104 discards or otherwise ignores when identifying trending or popular hashtags. Conversely, the annotation lists 220 can include one or more whitelists that include one or more annotations (e.g., user-defined annotations) that the system 104 anticipates, promotes, or positively identifies as trending at particular times. For example, a whitelist can include a list of hashtags that the system 104 identifies as trending in anticipation of a periodic trend or anticipated event that will cause one or more hashtags to trend among users of the social networking system 104.

As described above, the system 104 can group a set of digital content items having a user-defined annotation into subsets of digital content items. For example, FIGS. 3A-3C illustrate randomized subsets of instances of digital content items having a new years eve hashtag (#NYE) over a period of time spanning between 2012 and 2015. In particular, FIG.

3A shows a first subset 302a including instances of digital content items having the #NYE hashtag over a predefined number (e.g., 10,000) of random timestamps spanning a time period between 2012 and 2015. Similarly, FIG. 3B shows a second subset 302b including instances of digital content items having the #NYE hashtag over the predefined number of random timestamps spanning between 2012 and 2015. Further, FIG. 3C shows a third subset 302c including instances of digital content items having the #NYE hashtag over the predefined number of random timestamps spanning between 2012 and 2015. It is appreciated that the random timestamps are random for each individual subset. Further, it is appreciated that the system 104 can generate any number of subsets based on, for example, a number of instances of digital content items including the hashtag.

As described above, the system 104 can perform a first iteration of a clustering algorithm on the subsets of digital content items by performing, for example, a DBSCAN algorithm on the subsets of hashtags (or timestamps associated with instances of the hashtag) to identify temporal clusters of the hashtag within each subset. For example, as shown in FIG. 3A-3C, the system can perform a DBSCAN algorithm on each of the first subset 302a, second subset 302b, and third subset 302c to generate a corresponding cluster graph 304a-c for each of the individual subsets 302a-c. In particular the DBSCAN algorithm can identify one or more temporal clusters that include a threshold number of instances of the hashtag (or timestamps of the instances of the hashtag) included within a predefined range of timestamps. In one or more embodiments, the DBSCAN algorithm identifies clusters based on a number of digital content items that are separated by less than an ε value exceeding a minimum threshold number of hashtags.

As shown in FIG. 3A, the DBSCAN algorithm can generate a cluster representation 304a including one or more identified clusters. Additionally, as shown in FIG. 3B, the DBSCAN algorithm can generate a cluster representation 304b including one or more identified clusters. Further, as shown in FIG. 3C, the DBSCAN algorithm can generate a cluster representation 304c including one or more identified clusters. Additionally, as shown in FIG. 4A, the system 104 can combine the cluster representations 304a-c and generate a combined cluster graph 402 including a combination of identified clusters 406, 408a-b from each of the cluster representations 304a-c.

As shown in FIG. 4A, the combined cluster graph 402 includes a primary cluster 406 identified by the DBSCAN algorithm performed on each of the subsets 302a-c. For example, the system 104 can identify the primary cluster 406 based on an identification of a corresponding cluster in all of the randomized subsets 302a-c. Additionally, the system 104 can identify the identified cluster as a primary cluster 406 based on the number of timestamps included within the identified cluster as compared with one or more additional clusters identified in each of the randomized subsets 302a-c.

Additionally, as shown in FIG. 4A, the combined cluster graph 402 includes one or more secondary clusters 408a-b that represent temporal clusters that the system 104 identified for each of the randomized subsets 302a-c. For example, a first secondary cluster 408a may represent a temporal cluster that the system 104 identified in the third subset 302c without identifying a similar cluster in the first and second subsets 302a-b. Additionally, the second secondary cluster 408b may represent a combination of temporal clusters that the system 104 identifies in the first subset 302a and third subset 302c without identifying a similar cluster in the second subset 302b. For example, the second secondary cluster 408b may represent an echo cluster of instances of digital content items caused by various users sharing digital content items having the #NYE hashtag over one or more days after the primary cluster 406a.

In one or more embodiments, the system 104 distinguishes between the primary cluster 406 and the secondary clusters 408a-b based on a number of timestamps included within each identified cluster. In particular, the system 104 can consider a total number of timestamps identified in clusters for the combination of each of the randomized subsets 302a-c. For example, the system 104 can distinguish the primary cluster 406 from the secondary clusters 408a-b because the system 104 identifies a much larger number timestamps within the identified clusters from DBSCAN algorithm performed on each of the randomized subsets 302a-c. Additionally or alternatively, the system 104 can distinguish between the primary cluster 406 and the secondary clusters 408a-b based on the system 104 consistently identifying clusters in each of the randomized subsets 302a-c. For example, the system 104 can distinguish the primary cluster 406 from the secondary clusters 408a-b because the system 104 identified a corresponding cluster to the primary cluster 406 in all three of the randomized subsets 302a-c while only identifying corresponding clusters to the secondary clusters 408a-b in some (but not all) of the randomized subsets 302a-c.

FIG. 4B illustrates a resulting first iteration graph 404a that includes a first primary temporal cluster 406a (or simply "primary cluster 406a") representing the combination of identified temporal clusters from the subsets 302a-c of #NYE instances described above in connection with FIGS. 3A-3C. In particular, as shown in FIG. 4B, the first iteration graph 404a includes the primary cluster 406a without including one or more of the secondary clusters 408a-b shown in the combined cluster graph 402 of FIG. 4A. As shown in FIG. 4B, the first iteration graph 404a includes a single primary cluster 406a representative of a trend of #NYE hashtags occurring around the end of 2014 and the beginning of 2015.

Further, as shown in FIG. 4B, the primary cluster 406a includes a range 410a and center point 412b. In particular, the range 410a can represent a range of timestamps across which the system 104 identifies a trend of users using the #NYE hashtag. In one or more embodiments, the range 410a is defined by a range of timestamps between the 25th percentile and the 75th percentile of the primary cluster 406a (or any other percentile range). In one or more embodiments, the range 410a can include a range of timestamps that includes all timestamps within the primary cluster 406a. Additionally, in one or more embodiments, the range 410a can include other timestamps before or after the primary cluster 406a.

Further, as shown in FIG. 4B, the primary cluster 406a can include a center point 412a. In one or more embodiments, the center point 412a can refer to a midpoint of the primary cluster 406a. Alternatively, the center point 412a can refer to a center of mass for the timestamps representing the digital content items within the primary cluster 406a. In one or more embodiments, the center point 412a can represent a peak number of instances associated with a timestamp (or limited range of timestamps) representative of a time when the #NYE hashtag is most frequently used among users of the system 104.

Additionally, due to the growth of a user base of the system 104, the first iteration graph 404a shows a single primary cluster 406a of #NYE instances centered around the end of 2014 and the beginning of 2015 (i.e., new years eve).

In particular, because of the number of instances of #NYE around the beginning of 2015 as compared to any other period between 2012 and 2015 as a result of an exponentially growing user base, the first iteration of the DBSCAN algorithm may only identify a single cluster without identifying any other trends or clusters around other years, as would be expected in the present case (e.g., #NYE hashtag). As such, the system 104 may classify the range 410*a* of timestamps as a clustered portion of the first iteration graph and any remaining timestamps outside the range 410*a* as noise.

Upon classifying each of the timestamps as either a cluster (e.g., primary cluster 406*a*) or noise, the system 104 can determine a range of time (e.g., timestamps) to exclude from future iterations of the DBSCAN algorithm. In particular, as shown in FIG. 4B, the system 104 can identify a cutoff point 414 corresponding to a time or timestamp before the primary cluster 406*a* or, alternatively, at a point corresponding to the beginning of the range 410*a* of the primary cluster 406*a*. Thus, the system 104 can identify all timestamps after the cutoff point as digital content items or timestamps of digital content items to exclude from one or more additional iterations of the DBSCAN algorithm. Alternatively, rather than excluding all points after the cutoff point 414, one or more embodiments of the system 104 can exclude only those timestamps within the range 410*a* of the identified cluster 406*a* while still considering timestamps before and after the range 410*a* of the primary cluster 406*a*.

After identifying the range of timestamps to exclude from future iterations, the system 104 can perform one or more additional iterations of the DBSCAN algorithm on the digital content items excluding the portion of digital content items corresponding to the excluded range of timestamps. In particular, in one or more embodiments, the system 104 re-clusters the portion of digital content items classified as noise and performs a second iteration on a reduced set of digital content items classified as noise from the first iteration of the DBSCAN algorithm. In one or more embodiments, the system 104 performs the second iteration on all digital content items from the original set of digital content items having timestamps before the identified cutoff point 414. Additionally, as mentioned above, in one or more embodiments, the system 104 performs the second iteration on all digital content items from the original set of digital content items having timestamps before or after the identified range 410*a*, including instances from before the cutoff point 414 as well as instances after the identified range 410*a* of the primary cluster 406*a*.

In one or more embodiments, the system 104 excludes all points after the cutoff point 414 and generates new subsets of a predefined number of instances of digital content items or associated user-defined annotations (or timestamps corresponding to digital content items). For example, as shown in FIGS. 5A-5C, the system 104 generates a first subset 502*a* of a reduced set of digital content items including 10,000 instances of digital content items having the #NYE hashtag over a period time corresponding to random timestamps prior to the cutoff point 414 (e.g., digital content items that do not correspond to a previously identified temporal cluster). Similarly, the system 104 can generate a second subset 502*b* and a third subset 502*c* of the reduced set of digital content items including 10,000 instances of digital content items or timestamps that pre-date the cutoff point 414. In one or more embodiments, the system 104 may generate fewer subsets of the predefined number of timestamps as a result of fewer digital content items included within the reduced set of digital content items. Alternatively, each iteration can include a similar number of subsets on which the system 104 performs the DBSCAN algorithm.

As shown in FIGS. 5A-5C, the system 104 can perform the DBSCAN algorithm on each of the subsets 502*a-c* to identify one or more additional clusters within each of the subsets 502*a-c*. In particular, the system 104 can perform the DBSCAN algorithm and generate a cluster graph 504*a-c* for each of the subsets 502*a-c*. As shown in FIGS. 5A-5C, the cluster graphs 504*a-c* can include one or more additional clusters across the range of time between 2012 and 2014 and excluding timestamps near or after 2015 (or timestamps included within the first primary cluster 406*a*).

In one or more embodiments, the system 104 performs the DBSCAN using similar threshold and ε values as were used in performing the DBSCAN algorithm as described above in connection with performing the first iteration of the DBSCAN algorithm on the subsets 302*a-c* of FIG. 3. Alternatively, in one or more embodiments the system 104 modifies one or both of the threshold value and the ε value in performing each iteration of the DBSCAN algorithm on the different groupings of the digital content items. For example, the system 104 can decrease the threshold number of instances of the user-defined annotations to classify a group of instances as a cluster. The system 104 can also increase the ε value (or minimum distance between timestamps) in identifying the temporal clusters using the DBSCAN algorithm to improve the chances of identifying one or more additional clusters.

FIG. 6A illustrates a resulting second iteration graph 404*b* that includes a second primary temporal cluster 406*b* (or simply "primary cluster 406*b*") and a third primary temporal cluster 406*c* (or simply "primary cluster 406*c*") representing temporal clusters identified by the system 104 upon performing the second iteration of the DBSCAN algorithm. Similar to the first iteration, the second iteration graph 404*b* can include an identification of primary clusters 406*b-c* after disregarding one or more secondary clusters that the system 104 has determined should not be included as primary clusters 406*b-c* on the second iteration graph 404*b*. More specifically, as shown in FIG. 6A, the second iteration graph 404*b* includes a second primary cluster 406*b* having a range 410*b* and center point 412*b* around the end of 2013 and the beginning of 2014. Additionally, the second iteration graph 404*b* includes a third identified primary cluster 406*c* having a range 410*c* and a center point 412*c* around the end of 2012 and the beginning of 2013. Further, due to the increasing size of the user base (and more frequent use of the #NYE hashtag) between 2013 and 2014, the second primary cluster 406*b* can be larger than the third primary cluster 406*c*.

As described above, the system 104 can perform any number of iterations of the DBSCAN algorithm to identify any number of primary clusters. In the example of identifying clusters of the #NYE hashtag, the system 104 can perform a third iteration to identify one or more additional primary clusters. For example, as shown in FIG. 6A, the system 104 can determine a second cutoff point 414 and remove digital content items or timestamps corresponding to the second cluster 406*b* and the third cluster 406*c* in performing a third iteration of the DBSCAN algorithm. In one or more embodiments, the system 104 can perform a third iteration on a further reduced set of digital content items including timestamps of digital content items prior to the second cutoff point 414 while discarding all digital content items having timestamps later than the second cutoff point 414.

FIG. 6B illustrates a third iteration graph 404*c* in which a fourth temporal cluster 406*d* has been identified by performing a third iteration of the DBSCAN algorithm on one or more subsets of the further reduced set of digital content items. In particular, similar to other iterations described above, the system 104 can group the further reduced set of digital content items including digital content items having timestamps before the second cutoff point 414 to generate one or more subsets upon which the system 104 performs the DBSCAN algorithm. As shown in FIG. 6B, the system 104 can perform the DBSCAN algorithm on one or more subsets to identify a fourth primary cluster 406d having a range 410d and a center point 412d around the end of 2011 and the beginning of 2012.

Upon performing any number of iterations of the DBSCAN algorithm on the set of digital content items, the system 104 can combine the iteration graphs into a combined graph that includes all the primary clusters 406a-d. For example, FIG. 7 shows a combined iteration graph 702 including each of the four identified primary clusters 406a-d from the three iterations of the DBSCAN algorithm positioned across the range of timestamps. As shown in FIG. 7, the combined iteration graph 702 includes four primary clusters 406a-d having center points 412a-d positioned about one year apart from each other.

As described above, the system 104 can further determine whether the user-defined annotation is periodic. In particular, the system 104 can determine whether the user-defined annotation is periodic based on a time period between identified temporal clusters (e.g., primary clusters). For example, as shown in FIG. 7, the system 104 can determine a first time period 704a (e.g., a number of seconds) between the first primary cluster 406a and the second primary cluster 406b. In one or more embodiments, the system 104 determines a time period between clusters by calculating a time period between the first center point 412a of the first primary cluster 406a and the second center point 412b of the second primary cluster 406b. Additionally, using a similar process as determining the first time period 704a, the system 104 can determine a second time period 704b between the second primary cluster 406b and the third primary cluster 406c. Similarly, the system 104 can determine a third time period 704c between the third primary cluster 406c and the fourth primary cluster 406d.

Additionally, in one or more embodiments, the system 104 determines whether the user-defined annotation is periodic by comparing time periods 704a-c between primary clusters 406a-d to one or more standard or known lengths of time. For example, the system can compare a number of seconds for each time period 704a-c to a number of seconds in a standard period of time (e.g., hour, day, week, month, year). In one or more embodiments, the system 104 determines that the user-defined annotation is periodic if the average of the time periods 704a-c between primary clusters 406a-d is within a threshold margin of error of a standard period of time. Alternatively, the system 104 can determine that the user-defined annotation is periodic if none of the identified time periods 704a-c between primary clusters 406a-d varies from the standard period of time by a threshold margin of error.

In addition to determining whether the user-defined annotations are periodic, the system 104 can further determine a period-type of the periodic annotation. For example, the system 104 can identify the standard period of time that most closely matches the identified time periods 704a-c and determine the period type. Additionally, as mentioned above, the system 104 can further compare the time periods 704a-c to known time periods other than standard periods of time (e.g., lunar intervals, calendar specific intervals) and determine period types other than standard period types having relatively uniform time periods. Additionally, in one or more embodiments, the system 104 accounts for other variations that may contribute to time intervals 704a-d having slight variances (e.g., leap-year, different months). For example, the system 104 can include slight variances within a threshold margin of error when comparing the calculated time intervals 704a-c with known time intervals.

In addition to comparing the time periods 704a-c to standard (or otherwise known) periods of time, the system 104 can further determine whether the user-defined annotation is periodic based on a number of identified primary clusters 406a-d. For example, the system 104 can compare a number of primary clusters 406a-d with a threshold number of clusters required to identify a user-defined annotation as periodic. If both the time periods 704a-c fall within a threshold margin of error and the number of primary clusters 406a-d exceeds a threshold number of clusters, the system 104 can identify the user-defined annotation as periodic.

In one or more embodiments, the system 104 can determine a threshold number of clusters based on a period type. In particular, a shorter period type may have a threshold number of clusters higher than a longer period type. For example, a weekly period type may have a minimum threshold of ten primary clusters in order to identify a user-annotation as periodic. As another example, a yearly period type may have a minimum threshold of three primary clusters in order to identify a user-annotation as periodic. The system 104 can include different rules related to margin of error and minimum number of clusters depending on period type and/or number of iterations.

FIGS. 8A-8B illustrates another example set of digital content items having a user-defined annotation. In particular, as shown in FIG. 8A, a set of digital content items can include a plurality of digital content items across a defined range of timestamps having a #TBT (throw back thursday) hashtag. Consistent with one or more embodiments described herein, the system 104 can perform one or more iterations of a clustering algorithm on the set of digital content items having the #TBT hashtag.

For example, as shown in FIG. 8A, the system 104 can divide the set of digital content items into one or more subsets 802 of timestamps that span across a defined range of time. In particular, the subset 802 of timestamps shows instances of the #TBT hashtag across a time period of approximately ten weeks. Additionally, similar to one or more embodiments described above and as shown in FIG. 8A, the system 104 performs a clustering algorithm (e.g., DBSCAN algorithm) on the subset 802 of timestamps to identify clusters and generate a cluster graph 804 of the subset 802. While FIGS. 8A-8B illustrate one subset 802, the system 104 can perform the clustering algorithm on any number of subsets including any number of instances of the #TBT hashtag.

Consistent with one or more embodiments described herein, the system 104 can combine one or more cluster graphs 804 and perform any number of iterations to generate a combined graph 806 that includes any number of identified primary clusters 808 of the digital content item having the #TBT hashtag. In one or more embodiments, the system 104 identifies a threshold number of primary clusters 808 using a single iteration. Alternatively, the system 104 can perform multiple iterations on the set of digital content items and reduced sets of the digital content items to identify a threshold number of primary clusters 808. In the example shown in FIGS. 8A-8B, the system 104 can identify at least 10 primary clusters 808 using one or more iterations of the clustering algorithm.

Additionally, as shown in FIG. 8B, the system 104 can identify whether the #TBT hashtag is periodic. For example, the system 104 can compare time periods 810 between identified clusters 808 to one or more known lengths of time. As shown in FIG. 8B, each of the time periods 810 correspond to week-long periods of time. As such, the system 104 can identify that the #TBT is a weekly period-type. Further, the system 104 can determine if the number of identified clusters 808 exceeds a threshold number of clusters for the identified period-type. For example, because the system 104 has identified ten or more clusters 808 where a threshold number of clusters for a weekly period-type is ten, the system 104 can identify the #TBT hashtag as periodic and having a weekly period-type.

Moreover, as described above, where the system 104 identified one or more user-defined annotations as periodic, the system 104 can add one or more periodic annotations to a blacklist or whitelist. For instance, in the example described above in connection with FIGS. 3A-7, the system 104 can add #NYE to a blacklist or whitelist based on a determination that the #NYE hashtag is yearly-trending periodic hashtag. Additionally, in the example described above in connection with FIG. 8A-8B, the system 104 can add #TBT to a blacklist or whitelist based on a determination that the #TBT hashtag is a weekly-tending periodic hashtag.

FIGS. 1-8B, the corresponding text, and the examples, provide a number of different systems and devices that enable a social networking system 104 to identify periodic trends of user-defined annotations among users of the social networking system 104. In addition to the foregoing, one or more embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

Figure 9:
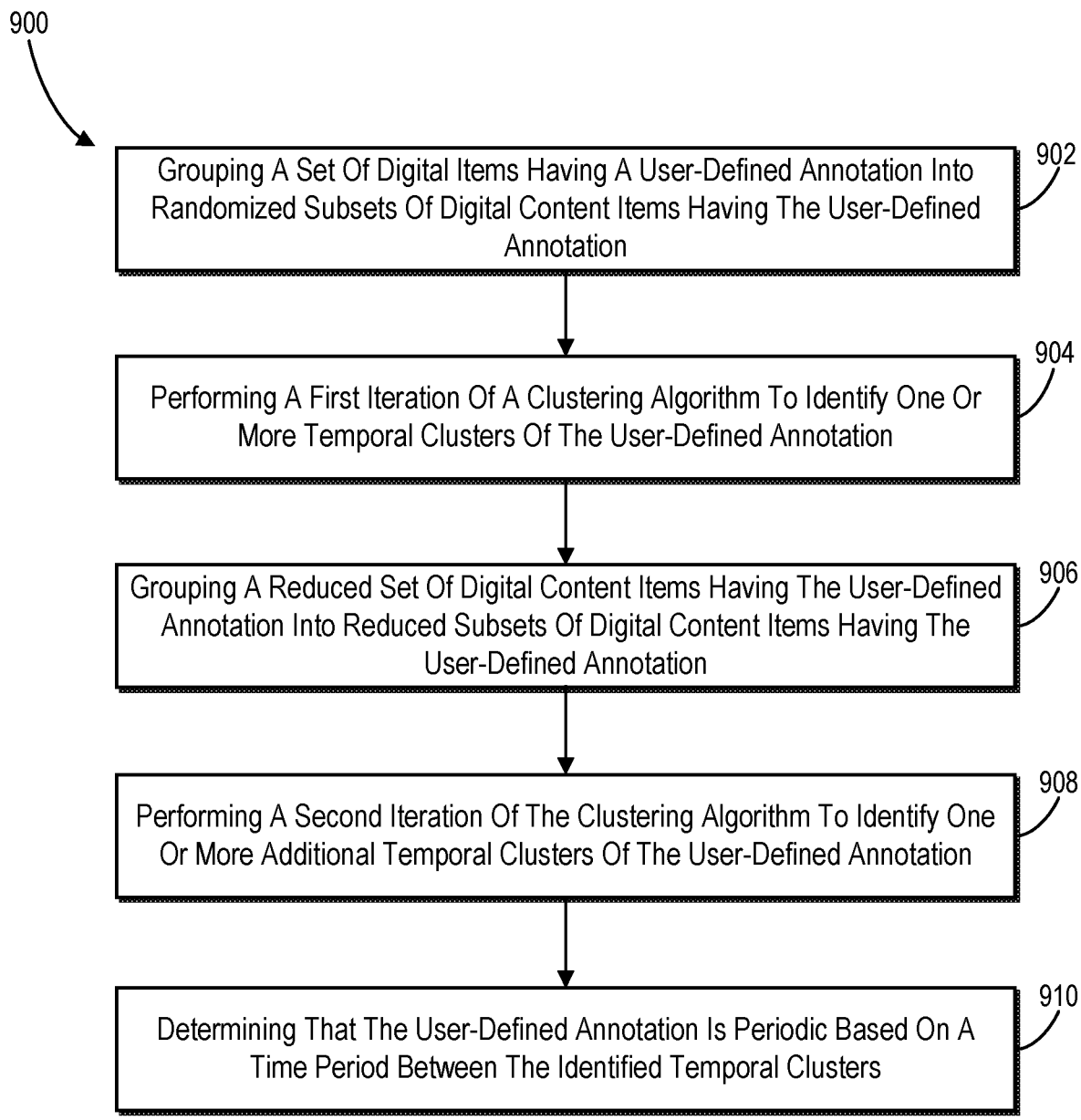
FIG. 9 illustrates a flow diagram of a method for identifying one or more periodic annotations associated with a collection of digital content items.

FIG. 9 illustrates a flowchart of a series of acts in a method 900 of analyzing a set of digital content items having a user-defined annotation and identifying one or more periodic trends associated with the user-defined annotation over a defined period of time. In one or more embodiments, the method 900 is performed in a digital medium environment that includes the social networking system 104. The method 900 is intended to be illustrative of one or more methods in accordance with the present disclosure, and is not intended to limit potential embodiments. Alternative embodiments can include additional, fewer, or different steps than those articulated in FIG. 9.

FIG. 9 illustrates a flowchart of an example method 900 of determining whether a user-defined annotation periodically trends among users of a social networking system 104. The method includes an act 902 of grouping a set of digital content items having a user-defined annotation into randomized subsets of digital content items having the user-defined annotation. For example, in one or more embodiments, the act 902 involves grouping a set of digital content items associated with timestamps and having a user-defined annotation into randomized subsets of digital content items having the user-defined annotation. Further, in one or more embodiments, grouping the set of digital content items into randomized subsets of digital content items involves generating groups of randomized instances of the user-defined annotation. The randomized instances can include random timestamps associated with the set of digital content items over a defined period of time. For example, grouping the set of digital content items into randomized subsets can involve generating one or more subsets of instances of digital content items having random timestamps across a defined range of timestamps.

Additionally, as described above, the set of digital content items can include a collection of digital content shared by users of a social networking system 104. For example, the set of digital content items can include a collection of posts shared with one or more users of the social networking system 104. Each of the posts can include timestamps that span over a defined period of time. Further, as described above, in one or more embodiments, the user-defined annotation includes a hashtag included within or otherwise associated with a respective digital content item (e.g., post). It is appreciated that the set of digital content items can include any number of digital content items. Further, the randomized subsets of digital content items can include any number of instances of digital content items. For example, in one or more embodiments, the randomized subsets of digital content items include randomized subsets of 10,000 instances of digital content items having a user-defined annotation (e.g., hashtag).

As shown in FIG. 9, the method 900 further includes an act 904 of performing a first iteration of a clustering algorithm to identify one or more temporal clusters of the user-defined annotation. For example, in one or more embodiments, the act 904 involves performing, by at least one processor and for each of the randomized subsets of digital content items, a first iteration of a clustering algorithm to identify one or more temporal clusters of the user-defined annotation for the set of digital content items. Further, in one or more embodiments, performing the first iteration involves performing a density-based spatial clustering of applications with noise (DBSCAN) algorithm on each of the randomized subsets of digital content items to identify one or more temporal clusters for each of the randomized subsets of digital content items. For example, performing the first iteration can involve performing the DBSCAN algorithm on each subset of instances of digital content items to identify one or more temporal clusters of user-defined annotations across a range of timestamps. Further, performing the first iteration can involve combining the results of performing the DBSCAN algorithm on multiple subsets of instances of digital content items to identify one or more primary temporal clusters and distinguishing the primary temporal clusters from one or more secondary temporal clusters identified in some or all of the subsets.

As shown in FIG. 9, the method 900 further includes an act 906 of grouping a reduced set of digital content items having the user-defined annotation into reduced subsets of digital content items having the user-defined annotation. For example, in one or more embodiments, the act 906 involves grouping a reduced set of digital content items associated with timestamps having the user-defined annotation into reduced subsets of digital content items having the user-defined annotation. For example, grouping the reduced set of digital content items can involve generating a reduced set of digital content items that excludes a portion of the digital content items from the set of digital content items. In particular, grouping the reduced set of digital content items can involve generating a reduced set of digital content items by removing a plurality of instances of the user-defined annotation from the set of digital content items. Specifically, generating the reduced set of digital content items can involve removing a plurality of instances corresponding to instances of the user-defined annotation within the identified one or more temporal clusters. In one or more embodiments, generating the reduced set of digital content items involves generating a reduced set of digital content items that includes any instances of content items having the user-defined annotation classified as noise in the first iteration of the clustering algorithm. As such, generating the reduced set of digital content items can involve identifying and grouping the instances of content items having the user-defined annotation that were classified as noise while excluding those instances of content items having the user-defined annotation that were identified as part of one or more temporal clusters.

Generating the reduced set of digital content items can involve removing instances of user-defined annotations from those user-defined annotations contained within the identified cluster(s). For example, generating the reduced set of digital content items can involve removing each instance of the set of digital content items having a timestamp that falls within a range of timestamps corresponding to the identified one or more temporal clusters. Alternatively, generating the reduced set of digital content items can involve removing instances of user-defined annotations contained within an identified cluster and any instances of the user-defined annotation having timestamps after the identified cluster. For example, generating the reduced set of digital content items can involve identifying a cutoff point at some timestamp prior to or towards the beginning of an identified cluster and removing all instances of the set of digital content items having a later timestamp than the cutoff point. Thus, the reduced set of digital content item can include all instances of the digital content items from the set of digital content items that have timestamps prior to a cutoff point (or cutoff timestamp).

As shown in FIG. 9, the method 900 further includes an act 908 of performing a second iteration of the clustering algorithm to identify one or more additional temporal clusters of the user defined annotation. For example in one or more embodiments, the act 908 involves performing, by the at least one processor and for each of the reduced subsets of digital content items, a second iteration of the clustering algorithm to identify one or more additional temporal clusters of the user defined annotation for the reduced set of digital content items. In particular, the act 908 involves performing the second iteration of the clustering algorithm on content items that do not correspond to any previously identified temporal cluster. Performing the second iteration of the clustering algorithm may include similar features as performing the first iteration. For example, performing the second iteration may involve performing a DBSCAN algorithm on each of the reduced subsets of digital content items having the user-defined annotation. Additionally, performing the second iteration may involve combining the results of performing the DBSCAN algorithm on each of the reduced subsets of digital content items and identifying one or more primary temporal clusters of user-defined annotations for the reduced set of digital content items.

In one or more embodiments, the method 900 can include performing any number of iterations of the clustering algorithm on the set of digital content items and reduced sets of the digital content items. Additionally, in one or more embodiments, performing multiple iterations can involve performing iterations of the clustering algorithm on gradually reduced sets of the digital content items for each iteration. For example, performing the first iteration of the clustering algorithm can involve further classifying a group of the digital content items outside a range of the one or more temporal clusters as noise. In particular, the instances of the digital content items within the one or more temporal clusters can be identified as clustered instances of user-defined annotations. Additionally, the instances of the digital content items outside the one or more temporal clusters can be identified as noise. Further, in one or more embodiments, performing the second iteration of the clustering algorithm can involve performing the clustering algorithm on the group of digital content items that are identified as noise without considering any instances of the set of digital content items within the range of the one or more temporal clusters. Thus, one or more embodiments of the reduced set of digital content items can refer to any digital content items of the set of digital content items that have timestamps outside the range of timestamps within the identified temporal cluster(s) from performing the first iteration of the clustering algorithm.

As shown in FIG. 9, the method 900 further includes act 910 of determining that the user-defined annotation is periodic based on a time period between the identified temporal clusters. For example, in one or more embodiments, act 910 involves determining that the user-defined annotation is periodic based on a time period between the one or more temporal clusters and the one or more additional temporal clusters. In one or more embodiments, determining that the user-defined annotation is periodic involves calculating time periods between each of the one or more temporal clusters and the one or more additional temporal clusters. Further, determining that the user-defined annotation is periodic can involve comparing the calculated time periods to one or more known time periods (e.g., days, weeks, months, years). Determining that the user-defined annotation is period can further involve identifying a period-type based on comparing the time periods to the one or more known time periods. Examples of period-types include daily, weekly, monthly, or yearly intervals. Further, in one or more embodiments, determining that the user-defined annotation is periodic involves determining that a number of the one or more temporal clusters and the one or more additional temporal clusters exceeds a threshold number of clusters specific to the identified period-type. For example, the daily, weekly, monthly, and/or yearly intervals may have different threshold numbers of clusters to identify in order to identify a user-defined annotation as periodic.

Moreover, in one or more embodiments, the method 900 further include an act of adding the user-defined characteristic to a blacklist of annotation based on determining that the user-defined annotation is periodic. For example, the method 900 can include adding the user-defined characteristic to a blacklist in response to determining that the user-defined annotation is periodic. Further, in one or more embodiments, the method 900 can involve identifying one or more additional user-defined characteristics related to the user-defined characteristic and adding the one or more additional user-defined characteristics to the blacklist of characteristics.

Figure 10:
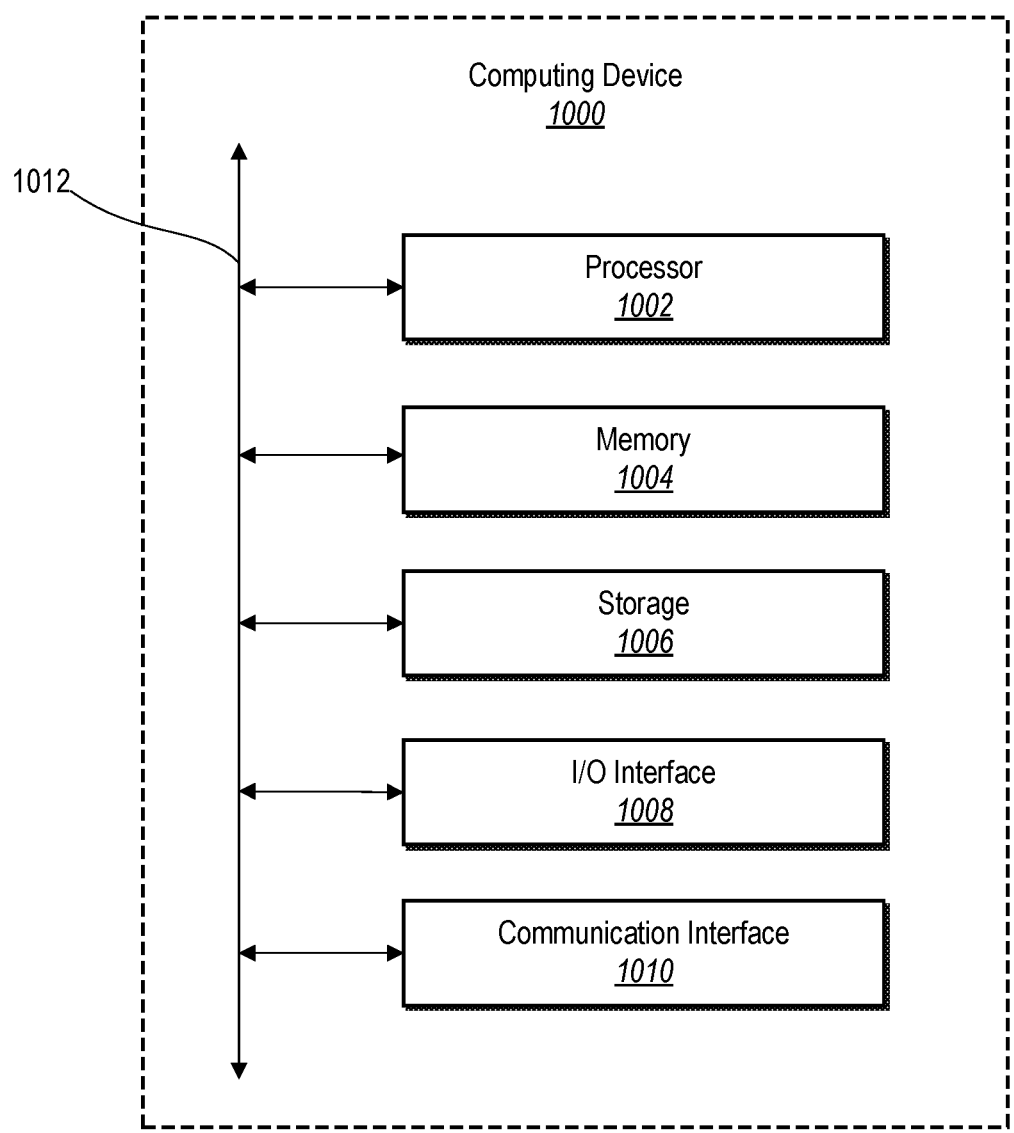
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that system 100, computing devices 102, 104, sever 108, system 200, client device 202 and server device 204 each comprise one or more computing devices in accordance with implementations of computing device 1000. As shown by FIG. 10, the computing device can comprise a processor 1002, a memory 1004, a storage device 1006, an I/O interface 1008, and a communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, a computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers (TLBs). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive (HDD), a floppy disk drive, flash memory, an optical disc, a magneto-optical disc, magnetic tape, or a Universal Serial Bus (USB) drive or a combination of two or more of these. Storage device 1006 may include removable or non-removable (or fixed) media, where appropriate. Storage device 1006 may be internal or external to the computing device 1000. In particular embodiments, storage device 1006 is non-volatile, solid-state memory. In other embodiments, Storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 1012 may include hardware, software, or both that couples components of computing device 1000 to each other. As an example and not by way of limitation, communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, system 100 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 11:
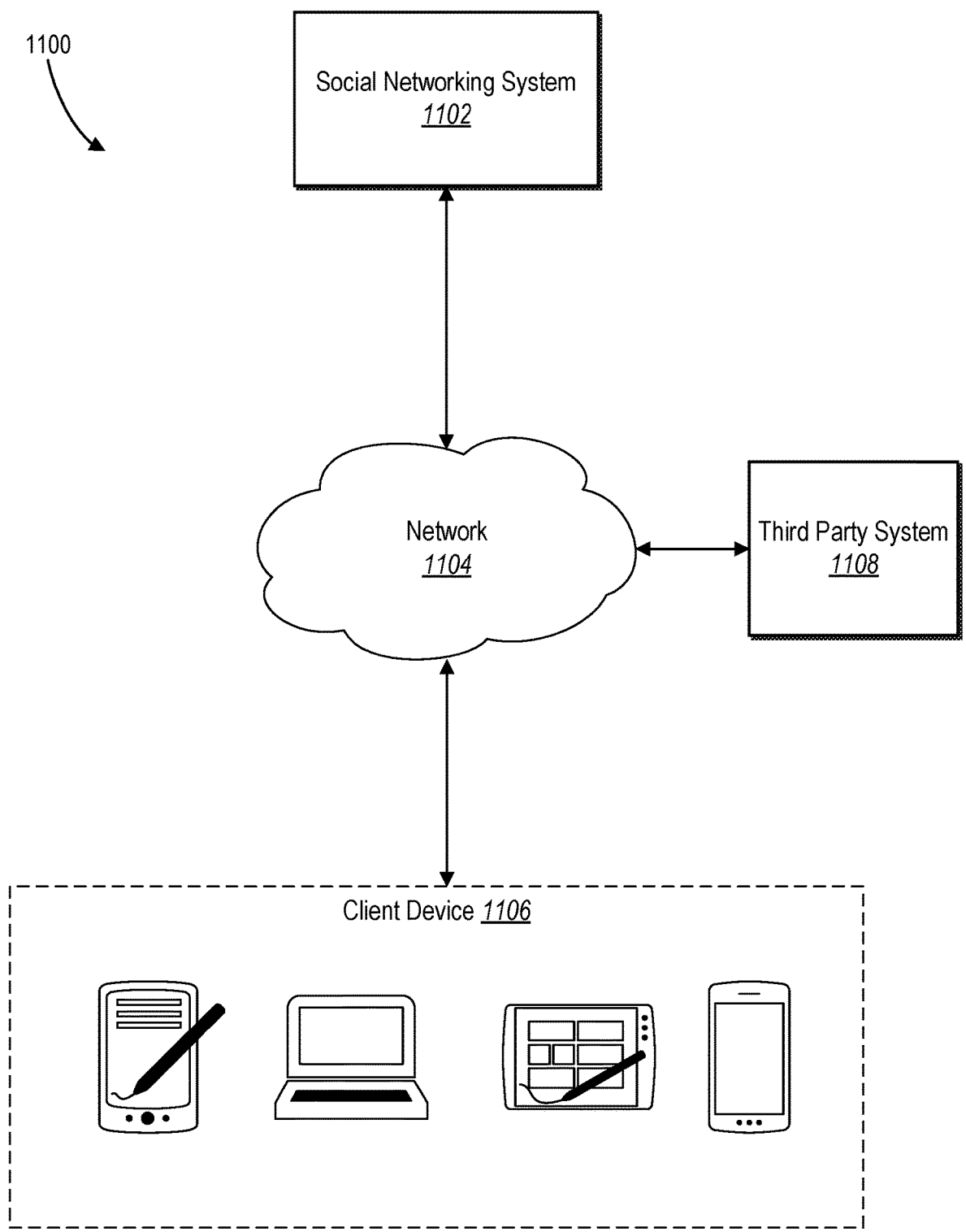
FIG. 11 illustrates a network environment of a social networking system according to one or more embodiments.

FIG. 11 illustrates an example network environment 1100 of a social-networking system. In particular embodiments, a social-networking system 1102 may comprise one or more data stores. In particular embodiments, the social-networking system 1102 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 1102 may comprise one or more computing devices (e.g., servers) hosting functionality directed to operation of the social-networking system 1102. A user of the social-networking system 1102 may access the social-networking system 1102 using a client device such as client device 1106. In particular embodiments, the client device 1106 can interact with the social-networking system 1102 through a network 1104.

The client device 1106 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access the social-networking system 1102.

While these methods, systems, and user interfaces utilize both publicly available information as well as information provided by users of the social-networking system, all use of such information is to be explicitly subject to all privacy settings of the involved users and the privacy policy of the social-networking system as a whole.

Figure 12:
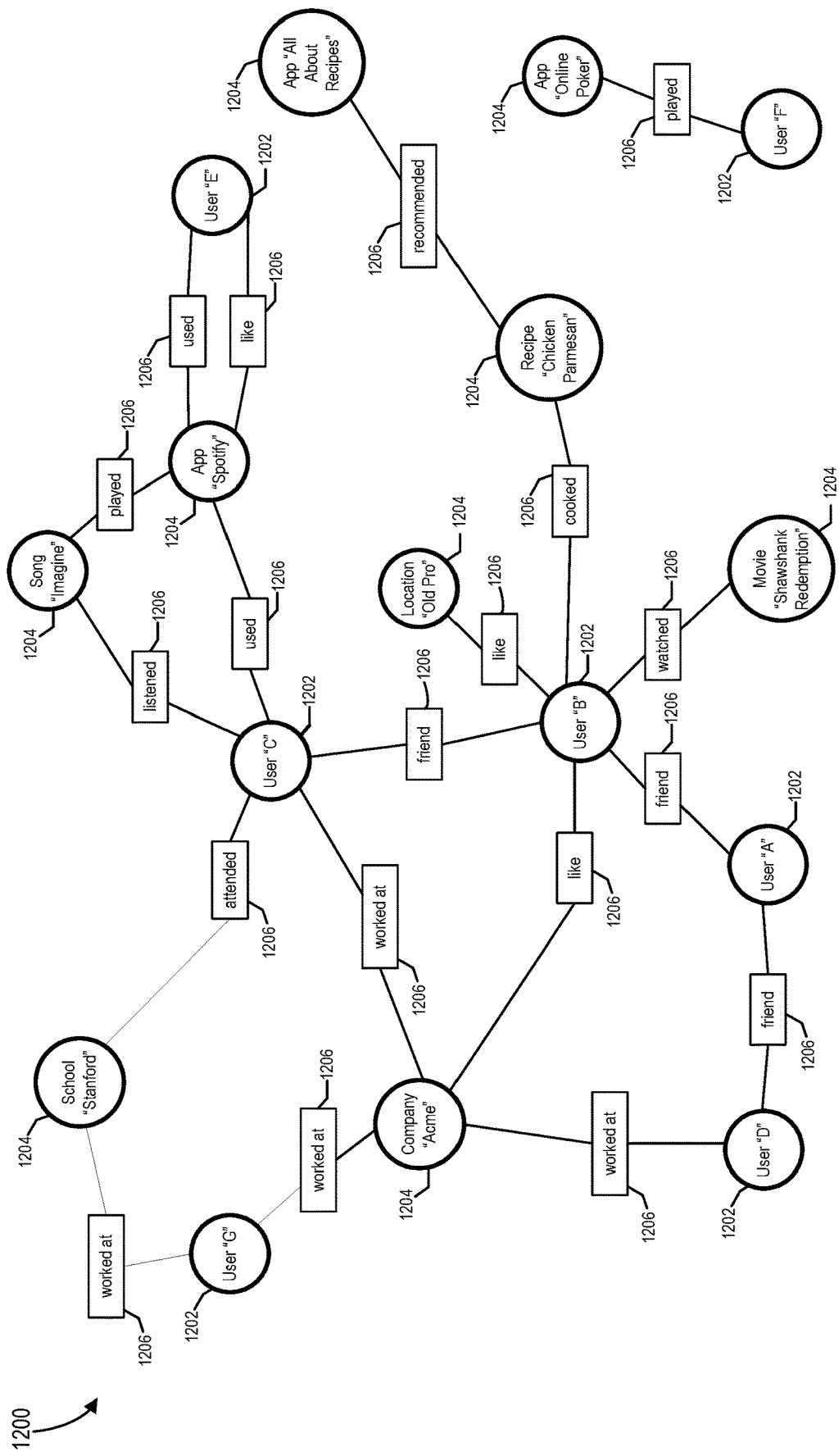
FIG. 12 illustrates an example social graph of a social networking system in accordance with one or more embodiments.

FIG. 12 illustrates example social graph 1200. In particular embodiments, social networking system 1102 may store one or more social graphs 1200 in one or more data stores. In particular embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In particular embodiments, a social networking system 1102, client system 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In particular embodiments, a user node 1202 may correspond to a user of social networking system 1102. As an example and not by way of limitation, a user may be an individual (human user), an entity (e.g., an enterprise, business, or third-party application), or a group (e.g., of individuals or entities) that interacts or communicates with or over social networking system 1102. In particular embodiments, when a user registers for an account with social networking system 1102, social networking system 1102 may create a user node 1202 corresponding to the user, and store the user node 1202 in one or more data stores. Users and user nodes 1202 described herein may, where appropriate, refer to registered users and user nodes 1202 associated with registered users. In addition or as an alternative, users and user nodes 1202 described herein may, where appropriate, refer to users that have not registered with social networking system 1102. In particular embodiments, a user node 1202 may be associated with information provided by a user or information gathered by various systems, including social networking system 1102. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1204 may correspond to a concept. As an example and not by way of limitation, a concept may correspond to a place (such as, for example, a movie theater, restaurant, landmark, or city); a website (such as, for example, a website associated with social-network system 1102 or a third-party website associated with a web-application server); an entity (such as, for example, a person, business, group, sports team, or celebrity); a resource (such as, for example, an audio file, video file, digital photo, text file, structured document, or application) which may be located within social networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including social networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1204 may be associated with one or more data objects corresponding to information associated with concept node 1204. In particular embodiments, a concept node 1204 may correspond to one or more webpages.

In particular embodiments, a node in social graph 1200 may represent or be represented by a webpage (which may be referred to as a "profile page"). Profile pages may be hosted by or accessible to social networking system 1102. Profile pages may also be hosted on third-party websites associated with a third-party server 1108. As an example and not by way of limitation, a profile page corresponding to a particular external webpage may be the particular external webpage and the profile page may correspond to a particular concept node 1204. Profile pages may be viewable by all or a selected subset of other users. As an example and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In particular embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 1106 to send to social networking system 1102 a message indicating the user's action. In response to the message, social networking system 1102 may create an edge (e.g., an "eat" edge) between a user node 1202 corresponding to the user and a concept node 1204 corresponding to the third-party webpage or resource and store edge 1206 in one or more data stores.

In particular embodiments, a pair of nodes in social graph 1200 may be connected to each other by one or more edges 1206. An edge 1206 connecting a pair of nodes may represent a relationship between the pair of nodes. In particular embodiments, an edge 1206 may include or represent one or more data objects or attributes corresponding to the relationship between a pair of nodes. As an example and not by way of limitation, a first user may indicate that a second user is a "friend" of the first user. In response to this indication, social networking system 1102 may send a "friend request" to the second user. If the second user confirms the "friend request," social networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In particular embodiments, an edge 1206 between a user node 1202 and a concept node 1204 may represent a particular action or activity performed by a user associated with user node 1202 toward a concept associated with a concept node 1204. As an example and not by way of limitation, as illustrated in FIG. 12, a user may "like," "attended," "played," "listened," "cooked," "worked at," or "watched" a concept, each of which may correspond to a edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, social networking system 1102 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, social networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (SPOTIFY) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "SPOTIFY").

In particular embodiments, social networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client system 1106) may indicate that he or she likes the concept represented by the concept node 1204 by clicking or selecting a "Like" icon, which may cause the user's client system 1106 to send to social networking system 1102 a message indicating the user's liking of the concept associated with the concept-profile page. In response to the message, social networking system 1102 may create an edge 1206 between user node 1202 associated with the user and concept node 1204, as illustrated by "like" edge 1206 between the user and concept node 1204. In particular embodiments, social networking system 1102 may store an edge 1206 in one or more data stores. In particular embodiments, an edge 1206 may be automatically formed by social networking system 1102 in response to a particular user action. As an example and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 1102 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 1102) or RSVP (e.g., through social networking system 1102) to an event associated with the advertisement. In addition or as an alternative, an advertisement may include social-networking-system context directed to the user. As an example and not by way of limitation, an advertisement may display information about a friend of the user within social networking system 1102 who has taken an action associated with the subject matter of the advertisement.

In particular embodiments, social networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 1102 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 1102 may calculate a coefficient based on a user's actions. Social networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Social networking system 1102 may analyze a user's actions to determine whether one or more of the actions indicate an affinity for subject matter, content, other users, and so forth. As an example and not by way of limitation, if a user may make frequently posts content related to "coffee" or variants thereof, social networking system 1102 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 1102 may calculate a coefficient based on the type of relationship between particular objects. Referencing the social graph 1200, social networking system 1102 may analyze the number and/or type of edges 1206 connecting particular user nodes 1202 and concept nodes 1204 when calculating a coefficient. As an example and not by way of limitation, user nodes 1202 that are connected by a spouse-type edge (representing that the two users are married) may be assigned a higher coefficient than a user nodes 1202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 1102 may determine that the user has a higher coefficient with respect to the first photo than the second photo because having a tagged-in-type relationship with content may be assigned a higher weight and/or rating than having a like-type relationship with content. In particular embodiments, social networking system 1102 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 1102 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1200. As an example and not by way of limitation, social-graph entities that are closer in the social graph 1200 (i.e., fewer degrees of separation) may have a higher coefficient than entities that are further apart in the social graph 1200.

In particular embodiments, social networking system 1102 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 1106 of the user). A first user may be more interested in other users or concepts that are closer to the first user. As an example and not by way of limitation, if a user is one mile from an airport and two miles from a gas station, social networking system 1102 may determine that the user has a higher coefficient for the airport than the gas station based on the proximity of the airport to the user.

In particular embodiments, social networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 1102 may provide information that is relevant to user's interests and current circumstances, increasing the likelihood that they will find such information of interest. In particular embodiments, social networking system 1102 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 1102 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, social networking system 1102 may calculate the coefficient (or access the coefficient information if it has previously been calculated and stored). In particular embodiments, social networking system 1102 may measure an affinity with respect to a particular process. Different processes (both internal and external to the online social network) may request a coefficient for a particular object or set of objects. Social networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1204 corresponding to a particular photo may have a privacy setting specifying that the photo may only be accessed by users tagged in the photo and their friends. In particular embodiments, privacy settings may allow users to opt in or opt out of having their actions logged by social networking system 1102 or shared with other systems (e.g., third-party system 1108). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 1102 may send a request to the data store for the object. The request may identify the user associated with the request and may only be sent to the user (or a client system 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

identifying a set of digital content items based on each digital content item of the set of digital content items comprising a user-defined annotation, and wherein each digital content item is associated with a timestamp;

grouping the set of digital content items into randomized subsets of digital content items by generating groups of instances of the user-defined annotation based on randomizing timestamps associated with the set of digital content items over a defined period of time;

performing, by at least one processor and for each of the randomized subsets of digital content items, a first iteration of a clustering algorithm to identify one or more temporal clusters of the user-defined annotation for the set of digital content items by:

determining a time distance value; and determining that timestamps within a range of timestamps are separated by less than the time distance value, wherein each of the one or more temporal clusters includes a threshold number of digital content items contained within the range of timestamps within the defined period of time; and wherein performing the clustering algorithm further comprises classifying a group of digital content items outside a range of the one or more temporal clusters as noise;

grouping a reduced set of digital content items associated with timestamps having the user-defined annotation into reduced subsets of digital content items having the user-defined annotation;

performing, by the at least one processor and for each of the reduced subsets of digital content items, a second iteration of the clustering algorithm by performing the clustering algorithm on the group of digital content items classified as noise without considering any instances of the set of digital content items within the range of the one or more temporal clusters to identify one or more additional temporal clusters of the user-defined annotation for the reduced set of digital content items; and determining that the user-defined annotation is periodic based on a time period between the one or more temporal clusters and the one or more additional temporal clusters.

2. The method as recited in claim 1, wherein identifying the one or more temporal clusters of the user-defined annotation for the set of digital content items comprises:

performing the first iteration of the clustering algorithm on each of the randomized subsets of digital content items to identify subset temporal clusters for each of the randomized subsets of digital content items;

combining the subset temporal clusters associated with each of the randomized subsets of digital content items; and identifying a primary cluster in the combination of the subset temporal clusters, wherein the one or more temporal clusters comprises the primary cluster.

3. The method as recited in claim 1, wherein the set of digital content items comprises a collection of posts shared with one or more users of a social networking system, the collection of posts comprising timestamps that span over the defined period of time.

4. The method as recited in claim 3, wherein the user-defined annotation comprises a hashtag associated with each post within the collection of posts.

5. The method as recited in claim 1, wherein performing the clustering algorithm to identify the one or more temporal clusters within the set of digital content items comprises performing a density-based spatial clustering of applications with noise algorithm on each of the randomized subsets of digital content items.

6. The method as recited in claim 1, further comprising generating the reduced set of digital content items, wherein generating the reduced set of digital content items comprises removing a plurality of instances of the user-defined annotation from the set of digital content items, the plurality of instances corresponding to instances of the user-defined annotation within the identified one or more temporal clusters.

7. The method as recited in claim 6, wherein removing the plurality of instances of the user-defined annotation from the set of digital content items comprises removing each instance of the set of digital content items from the set of digital content items having a timestamp that falls within the range of timestamps corresponding to the identified one or more temporal clusters.

8. The method as recited in claim 6, wherein removing the plurality of instances of the user-defined annotation from the set of digital content items comprises removing all instances of the set of digital content items having a later timestamp than a cutoff point prior to a first identified temporal cluster of the identified one or more temporal clusters.

9. The method as recited in claim 1, wherein grouping the set of digital content items into randomized subsets of digital content items comprises assigning a threshold number of digital content items from the set of digital content items into each randomized subset of digital content items.

10. The method as recited in claim 1, wherein determining that the user-defined annotation is periodic comprises:

calculating time periods between each of the one or more temporal clusters and the one or more additional temporal clusters;

comparing the calculated time periods to one or more known time periods; and identifying a period-type based on comparing the time periods to the one or more known time periods.

11. The method as recited in claim 10, wherein the period-type comprises one of a daily, weekly, monthly, or yearly interval.

12. The method as recited in claim 10, wherein determining that the user-defined annotation is periodic further comprises determining that a number of the one or more temporal clusters and the one or more additional temporal clusters exceeds a threshold number of clusters specific to the identified period-type.

13. The method as recited in claim 1, further comprising adding the user-defined annotation to a blacklist of annotations based on determining that the user-defined annotation is periodic.

14. The method as recited in claim 13, further comprising:

identifying one or more additional user-defined annotations related to the user-defined annotation; and adding the one or more additional user-defined annotations to the blacklist of annotations.

15. A system comprising:

at least one processor; and at least one non-transitory computer readable storage medium storing instructions thereon, that, when executed by the at least one processor, cause the system to:

identify a set of digital content items based on each digital content item of the set of digital content items comprising a user-defined annotation, and wherein each digital content item is associated with a timestamp;

group the set of digital content items into randomized subsets of digital content items by generating groups of instances of the user-defined annotation based on randomizing timestamps associated with the set of digital content items over a defined period of time;

perform, for each of the randomized subsets of digital content items, a first iteration of a clustering algorithm to identify one or more temporal clusters of the user-defined annotation for the set of digital content items by:

determining a time distance value; and determining that timestamps within a range of timestamps are separated by less than the time distance value, wherein each of the one or more temporal clusters includes a threshold number of digital content items contained within the range of timestamps within the defined period of time; and wherein performing the clustering algorithm further comprises classifying a group of digital content items outside a range of the one or more temporal clusters as noise;

group a reduced set of digital content items associated with timestamps having the user-defined annotation into reduced subsets of digital content items having the user-defined annotation;

perform, for each of the reduced subsets of digital content items, a second iteration of the clustering algorithm by performing the clustering algorithm on the group of digital content items classified as noise without considering any instances of the set of digital content items within the range of the one or more temporal clusters to identify one or more additional temporal clusters of the user-defined annotation for the reduced set of digital content items; and determine that the user-defined annotation is periodic based on a time period between the one or more temporal clusters and the one or more additional temporal clusters.

16. The system of claim 15, wherein identifying the one or more temporal clusters of the user-defined annotation for the set of digital content items comprises:

performing the first iteration of the clustering algorithm on each of the randomized subsets of digital content items to identify subset temporal clusters for each of the randomized subsets of digital content items;

combining the subset temporal clusters associated with each of the randomized subsets of digital content items; and identifying a primary cluster in the combination of the subset temporal clusters, wherein the one or more temporal clusters comprises the primary cluster.

17. The system of claim 15, wherein:

the set of digital content items comprises a collection of posts shared with one or more users of a social networking system, the collection of posts comprising timestamps that span over the defined period of time; and the user-defined annotation comprises a hashtag associated with each post within the collection of posts.

18. A non-transitory computer readable medium storing instructions thereon that, when executed by at least one processor, cause a computer device to:

identify a set of digital content items based on each digital content item of the set of digital content items comprising a user-defined annotation, and wherein each digital content item is associated with a timestamp;

group the set of digital content items into randomized subsets of digital content items by generating groups of instances of the user-defined annotation based on randomizing timestamps associated with the set of digital content items over a defined period of time;

perform, for each of the randomized subsets of digital content items, a first iteration of a clustering algorithm to identify one or more temporal clusters of the user-defined annotation for the set of digital content items by:

determining a time distance value; and determining that timestamps within a range of timestamps are separated by less than the time distance value, wherein each of the one or more temporal clusters includes a threshold number of digital content items contained within the range of timestamps within the defined period of time; and wherein performing the clustering algorithm further comprises classifying a group of digital content items outside a range of the one or more temporal clusters as noise;

group a reduced set of digital content items associated with timestamps having the user-defined annotation into reduced subsets of digital content items having the user-defined annotation;

perform, for each of the reduced subsets of digital content items, a second iteration of the clustering algorithm by performing the clustering algorithm on the group of digital content items classified as noise without considering any instances of the set of digital content items within the range of the one or more temporal clusters to identify one or more additional temporal clusters of the user-defined annotation for the reduced set of digital content items; and determine that the user-defined annotation is periodic based on a time period between the one or more temporal clusters and the one or more additional temporal clusters.

19. The non-transitory computer readable medium of claim 18, wherein identifying the one or more temporal clusters of the user-defined annotation for the set of digital content items comprises:

performing the first iteration of the clustering algorithm on each of the randomized subsets of digital content items to identify subset temporal clusters for each of the randomized subsets of digital content items;

combining the subset temporal clusters associated with each of the randomized subsets of digital content items; and identifying a primary cluster in the combination of the subset temporal clusters, wherein the one or more temporal clusters comprises the primary cluster.

20. The non-transitory computer readable medium of claim 18, wherein:

the set of digital content items comprises a collection of posts shared with one or more users of a social networking system, the collection of posts comprising timestamps that span over the defined period of time; and the user-defined annotation comprises a hashtag associated with each post within the collection of posts.

\* \* \* \* \*